United States Patent
Uesugi

(10) Patent No.: US 9,966,772 B2
(45) Date of Patent: May 8, 2018

(54) BATTERY-CHARGE CONTROL DEVICE, BATTERY CHARGER AND BATTERY PACK

(71) Applicant: MAKITA CORPORATION, Anjo-shi, Aichi (JP)

(72) Inventor: Hiroki Uesugi, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 52 days.

(21) Appl. No.: 15/170,367

(22) Filed: Jun. 1, 2016

(65) Prior Publication Data

US 2016/0359345 A1 Dec. 8, 2016

(30) Foreign Application Priority Data

Jun. 8, 2015 (JP) ................. 2015-115875

(51) Int. Cl.
*H02J 7/00* (2006.01)
*H02J 7/04* (2006.01)
(Continued)

(52) U.S. Cl.
CPC ............ *H02J 7/0026* (2013.01); *H02J 7/007* (2013.01); *H02J 7/0008* (2013.01);
(Continued)

(58) Field of Classification Search
CPC ....... Y02E 60/12; H02J 7/0004; H02J 7/0006; H01M 10/48; H01M 10/4257
(Continued)

(56) References Cited

U.S. PATENT DOCUMENTS

| 7,391,183 B2 | 6/2008 | Ariga et al. | |
| 2002/0145402 A1* | 10/2002 | Ueda | B60L 3/0046 320/104 |

(Continued)

FOREIGN PATENT DOCUMENTS

| EP | 2879227 A1 | 6/2015 |
| EP | 2961025 A1 | 12/2015 |

(Continued)

OTHER PUBLICATIONS

Aug. 22, 2016 Extended European Search Report issued in Patent Application No. 16172904.1.
(Continued)

*Primary Examiner* — Arun Williams
(74) *Attorney, Agent, or Firm* — Oliff PLC

(57) ABSTRACT

A battery-charge control device comprises an attachment-detecting unit, a temperature-obtaining unit, a voltage-obtaining unit, a threshold-value-determining unit, a determination unit, and a completion-processing unit. The threshold-value-determining unit determines, based on a battery temperature obtained by the temperature-obtaining unit, a completion-threshold-value corresponding to the battery temperature for determining necessity of charging when the attachment-detecting unit detects that the battery pack is attached to the battery charger. The determination unit performs a determination of whether a voltage obtained by the voltage-obtaining unit is equal to or greater than the completion-threshold-value determined by the threshold-value-determining unit when the attachment-detecting unit detects that the battery pack is attached to the battery charger. The completion-processing unit performs a specified battery-charge completion processing indicating unnecessity of charging of the battery by the battery charger when the determination unit determines that the obtained voltage is equal to or greater than the completion-threshold-value.

10 Claims, 8 Drawing Sheets

(51) Int. Cl.
*H01M 10/44* (2006.01)
*H01M 10/48* (2006.01)

(52) U.S. Cl.
CPC ............ H02J 7/0091 (2013.01); H02J 7/045 (2013.01); H02J 7/047 (2013.01); *H01M 10/443* (2013.01); *H01M 10/486* (2013.01); *H02J 7/0013* (2013.01)

(58) Field of Classification Search
USPC ........................................................ 320/106
See application file for complete search history.

(56) References Cited

U.S. PATENT DOCUMENTS

| | | | | |
|---|---|---|---|---|
| 2008/0197813 | A1* | 8/2008 | Asakura | H01M 10/05 320/150 |
| 2009/0058370 | A1* | 3/2009 | Odaohhara | H01M 10/441 320/152 |
| 2009/0273320 | A1* | 11/2009 | Ungar | H01M 4/5815 320/162 |
| 2011/0037439 | A1* | 2/2011 | Bhardwaj | H01M 4/13 320/152 |
| 2013/0234655 | A1* | 9/2013 | Miwa | H02J 7/0004 320/107 |
| 2015/0153416 | A1 | 6/2015 | Umemura et al. | |
| 2015/0372512 | A1 | 12/2015 | Umemura et al. | |
| 2016/0294021 | A1 | 10/2016 | Ueno | |

FOREIGN PATENT DOCUMENTS

| | | |
|---|---|---|
| JP | 2009-055729 A | 3/2009 |
| JP | 2010-016976 A | 1/2010 |
| JP | 2014-023347 A | 2/2014 |
| WO | 2015/064734 A1 | 5/2015 |
| WO | 2015064735 A1 | 5/2015 |

OTHER PUBLICATIONS

Oct. 20, 2017 Office Action issued in European Patent Application No. 16 172 904.1.

* cited by examiner

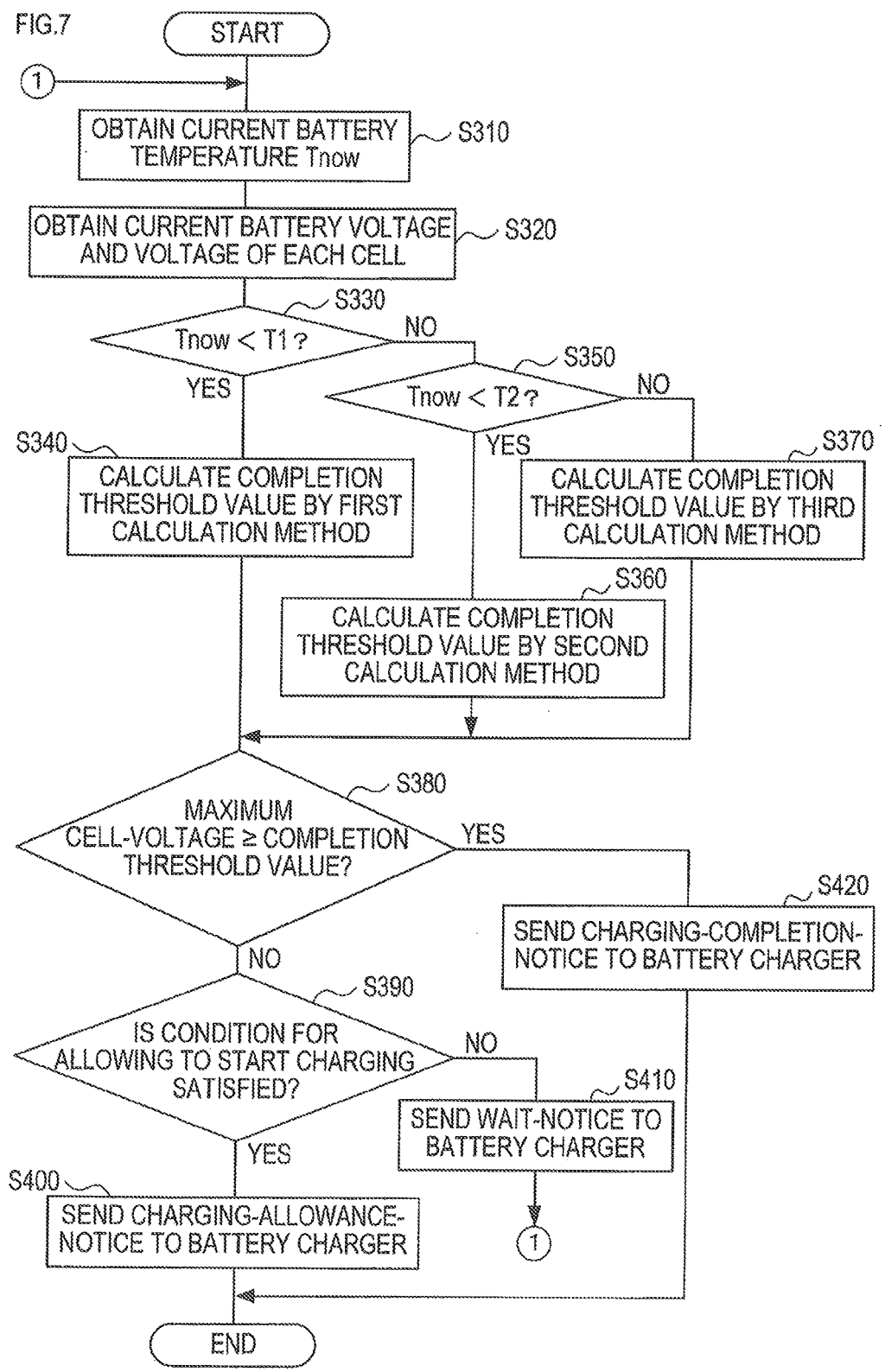

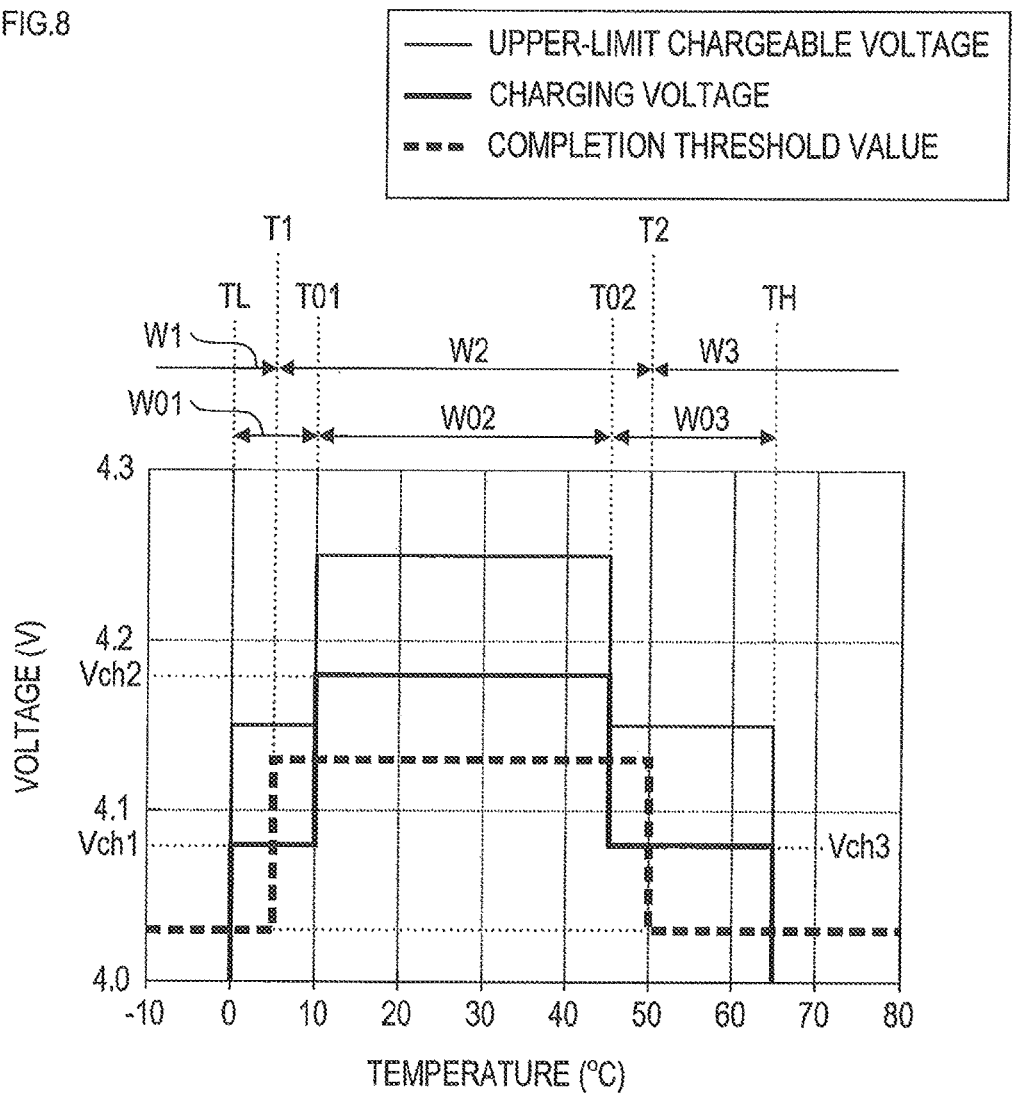

BATTERY-CHARGE CONTROL DEVICE, BATTERY CHARGER AND BATTERY PACK

CROSS-REFERENCE TO RELATED APPLICATIONS

This application claims the benefit of Japanese Patent Application No. 2015-115875 filed Jun. 8, 2015 in the Japan Patent Office, and the disclosure of which is incorporated herein by reference.

BACKGROUND

The present disclosure relates to a battery-charge control device that controls charging of a battery by a battery charger, a battery charger, and a battery pack.

Various methods of charging a battery have been proposed. JP2009055729A discloses a technique to change a charging current based on a surface temperature of a battery cell that constitutes a battery. JP2010016976A discloses a technique to change a charging voltage in accordance with a temperature of a battery cell.

SUMMARY

A battery that is used as a power supply of an electric power tool is often provided as installed within a battery pack which can be attached to and detached from the body of the power tool and a battery charger. In such a configuration, the battery can be charged by the battery charger by attaching the battery pack to the battery charger.

However, in such a configuration where the battery pack can be attached to and detached from the battery charger, the battery pack may be attached to the battery charger despite the battery being already in full-charge condition. If a fully charged battery pack is attached to the battery charger, then the battery may be overcharged.

In one aspect of the present disclosure, it is desirable to effectively reduce yielding the overcharged condition of the battery inside the battery pack that can be attached to and detached from the battery charger.

A battery-charge control device in one aspect of the present disclosure comprises an attachment-detecting unit, a temperature-obtaining unit, a voltage-obtaining unit, a threshold-value-determining unit, a determination unit, and a completion-processing unit.

The attachment-detecting unit detects that the battery pack having a battery is attached to the battery charger. The temperature-obtaining unit obtains a battery temperature which is a temperature of the battery. The voltage-obtaining unit obtains at least one of a voltage of the entire battery or a voltage of a part of the battery. The threshold-value-determining unit determines, based on the battery temperature obtained by the temperature-obtaining unit, a completion-threshold-value that corresponds to the battery temperature for determining necessity of charging of the battery in a case where the attachment-detecting unit detects that the battery pack is attached to the battery charger. The determination unit determines whether an obtained voltage, which is a voltage obtained by the voltage-obtaining unit, is equal to or greater than the completion-threshold-value determined by the threshold-value-determining unit in a case where the attachment-detecting unit detects that the battery pack is attached to the battery charger. The completion-processing unit performs a specified battery-charge completion processing that indicates unnecessity of charging of the battery by the battery charger in a case where the determination unit determines that the obtained voltage is equal to or greater than the completion-threshold-value.

In the battery-charge control device configured as mentioned above, if the battery pack is attached to the battery charger, then the battery temperature is obtained and the completion-threshold-value corresponding to the battery temperature is determined. The completion-threshold-value is not a constant value regardless of the battery temperature, but is a value in accordance with the battery temperature, determined in accordance with the battery temperature. And a determination is performed on whether the obtained voltage is equal to or greater than the completion-threshold-value. If the obtained voltage is equal to or greater than the completion-threshold-value, then the battery-charge completion processing is performed. The battery-charge completion processing is a specified processing that indicates unnecessity of charging of the battery and disables charging of the battery by the battery charger.

With the battery-charge control device configured as mentioned above, if the obtained voltage is already equal to or greater than the completion-threshold-value (a value corresponding to the battery temperature) when the battery pack is attached to the battery charger, then the battery-charge completion processing is performed. Therefore, over-charging of the battery inside the battery pack can be reduced effectively and appropriately in accordance with the battery temperature.

Note that the voltage obtained by the voltage-obtaining unit may be, for example, a voltage of the entire battery. Alternatively, in a case where a plurality of cells are connected in series to constitute a battery, it may be adapted to obtain a voltage of at least one of these cells. It may be appropriately determined which cell voltage should be targeted by the determination unit to perform the comparative determination against the completion-threshold-value in a case where a plurality of cell voltages is obtained.

The battery charger may be configured to start charge control for charging the battery in a case where the specified condition for starting battery charge is satisfied after the battery pack is attached to the battery charger. In this case, the determination unit may be configured to repeatedly perform the aforementioned determination during a period until the condition for starting battery charge is satisfied until the unit determines that the obtained voltage is equal to or greater than the completion-threshold-value, in a case where the attachment-detecting unit detects that the battery pack is attached to the battery charger.

A timing for performing the comparative determination between the obtained voltage and the completion-threshold-value may be, for example, only once right after when the battery pack is attached to the battery charger. However, it may cause the value of the obtained voltage to be smaller than the completion-threshold-value and may lead to a possibility that the battery-charge completion processing will not be performed, due to the battery being attached to the charger while the voltage of the battery has just discharged and has not recovered yet although the battery really is close to full-charge condition (a condition that does not require charging).

Such being the case, when it is detected that the battery pack is attached to the battery charger, the battery-charge completion processing can be performed on condition that the voltage is recovered to be equal to or greater than the completion-threshold-value by repeatedly making the comparative determination between the obtained voltage and the completion-threshold-value during a period until the condition for starting battery charge is satisfied until the obtained voltage becomes equal to or greater than the completion-threshold-value, even if the battery pack whose voltage is just discharged and temporarily low is attached. In other words, a determination whether charging is unnecessary can be performed swiftly.

Note that "repeatedly performing a determination" here does not only mean to repeat performing a determination at a regular frequency, but include any repetitive forms, for example, to repeat at an irregular frequency or to follow a specified time period pattern for performing a determination.

The threshold-value-determining unit may be configured to determine the completion-threshold-value by means of a threshold value determining method that corresponds to the battery temperature obtained by the temperature-obtaining unit among at least two types of prepared threshold value determining methods that differ depending on the battery temperature.

The completion-threshold-value corresponding to the obtained battery temperature can be appropriately and easily determined by preparing the threshold value determining method that corresponds to the battery temperature.

The battery charger may be configured to be allowed to charge the battery in a case where the battery temperature is in a preset chargeable temperature range. In such a case, the threshold-value-determining unit may be configured to determine the completion-threshold-value by means of the threshold value determining method that corresponds to the battery temperature obtained by the temperature-obtaining unit among at least two types of threshold value determining methods that differ depending on the battery temperature within the chargeable temperature range.

The completion-threshold-value within the chargeable temperature range can be appropriately and easily determined in accordance with the battery temperature by preparing at least two types of threshold value determining methods that differ depending on the battery temperature within the chargeable temperature range as mentioned above.

The battery charger may be configured to charge the battery so that the obtained voltage is equal to the charging voltage that corresponds to the battery temperature obtained by the temperature-obtaining unit, among at least two types of charging voltages that are preset within the chargeable temperature range and differ depending on the battery temperature. In such a case, the threshold-value-determining unit may be configured to determine that a value, which is smaller than the charging voltage corresponding to the battery temperature by a given value corresponding to the charging voltage, is the completion-threshold-value, in a case where the battery temperature obtained by the temperature-obtaining unit is within the chargeable temperature range.

Based on the charging voltage corresponding to the obtained battery temperature, a value which is smaller than the charging voltage at the obtained battery temperature by a given value is determined as the completion-threshold-value in the battery-charge control device configured as mentioned above. Thereby, the necessity of charging can be appropriately determined based on the completion-threshold-value.

The charging voltage may be set within the chargeable temperature range separately in each of a first range for battery charge, a second range for battery charge, and a third range for battery charge such that at least the charging voltage in the second range for battery charge is greater than the charging voltage in each of the first range for battery charge and the third range for battery charge. The first range for battery charge is below a given first boundary temperature for battery charge within the chargeable temperature range. The second range for battery charge is equal to or above the first boundary temperature for battery charge and is below a given second boundary temperature for battery charge within the chargeable temperature range. The third range for battery charge is equal to or above the second boundary temperature for battery charge within the chargeable temperature range.

And, for each of the first range for battery charge, the second range for battery charge, and the third range for battery charge, the threshold-value-determining unit may be configured to separately determine a value that is smaller than the charging voltage corresponding to each range by a given value corresponding to the charging voltage as the completion-threshold-value when within the chargeable temperature range.

In each of the aforementioned three ranges within the chargeable temperature range, a value smaller than each charging voltage separately set for each range by a given value is determined as the completion-threshold-value in the battery-charge control device configured as above. Thereby, the necessity of charging can be appropriately determined based on the completion-threshold-value that is in accordance with and appropriate for the range where the obtained battery temperature belongs.

Note that it can be appropriately determined how smaller than the set charging voltage the completion-threshold-value should be. And, for each range, the aforementioned given value that should be smaller than the charging voltage may be common regardless of the range, or may be different by the range.

Likewise the aforementioned, in a case where the charging voltage within the chargeable temperature range is set separately in each of the first range for battery charge, the second range for battery charge, and the third range for battery charge such that at least the charging voltage of the second range for battery charge is greater than the charging voltage of each of the first range for battery charge and the third range for battery charge, the threshold-value-determining unit may determine the completion-threshold-value as follows.

The threshold-value-determining unit may determine that a value, which is smaller than the charging voltage corresponding to the first range for battery charge by a given value corresponding to the charging voltage, is the completion-threshold-value in the first range for threshold value that is below a given first boundary temperature for threshold value within the chargeable temperature range. And the threshold-value-determining unit may determine that a value, which is smaller than the charging voltage corresponding to the second range for battery charge by a given value corresponding to the charging voltage, is the completion-threshold-value in the second range for threshold value that is equal to or above the first boundary temperature for threshold value and is below a given second boundary temperature for threshold value within the chargeable temperature range. And the threshold-value-determining unit may determine a value, which is smaller than the charging voltage corresponding to the third range for battery charge by a given value corresponding to the charging voltage, is the completion-threshold-value in the third range for threshold value that is equal to or above the second boundary temperature for threshold value within the chargeable temperature range.

At least one of, setting a value for the first boundary temperature for threshold value smaller than a value for the first boundary temperature for battery charge; or setting a value for the second boundary temperature for threshold value greater than a value for the second boundary temperature for battery charge, may be adopted in the threshold-value-determining unit.

For example, suppose that the obtained battery temperature is lower than the first boundary temperature for battery charge and is equal to or greater than the first boundary temperature for threshold value (in other words, a temperature within the first range for battery charge but close to the second range for battery charge). In this supposition, once the charging is started, the battery temperature possibly rises and enters the second range for battery charge; then, the battery temperature becomes greater than the charging voltage and allows more charging. Therefore, in a case where the battery temperature is within the first range for battery charge but close to the second range for battery charge, a determination of whether the charging is unnecessary can be appropriately performed by setting the completion-threshold-value rather high (to a value at least greater than the completion-threshold-value at a temperature lower than the first boundary temperature for threshold value), allowing for the possibility that the battery voltage enters the second range for battery charge once the charging is started.

Also, for example, suppose that the battery has just discharged and so the battery temperature is at relatively high temperature which is higher than the second boundary temperature for battery charge and is equal to or lower than the second boundary temperature for threshold value (in other words, a temperature within the third range for battery charge but close to the second range for battery charge). In this supposition, the battery temperature probably falls as time passes and enters the second range for battery charge depending on the surrounding environment and radiation efficiency of the battery, etc., and consequently, the charging voltage becomes greater and allows more charging. Therefore, in a case where the battery temperature is within the third range for battery charge but close to the second range for battery charge, a determination of whether the charging is unnecessary can be appropriately performed by setting the completion-threshold-value rather high (to a value at least greater than the completion-threshold-value at a temperature higher than the second boundary temperature for threshold value), allowing for possibility that the battery temperature falls.

In a case where the battery temperature obtained by the temperature-obtaining unit is not within the chargeable temperature range, the threshold-value-determining unit may be configured to determine the completion-threshold-value at the temperature, which is the closest to that obtained battery temperature among temperatures within the chargeable temperature range, as the completion-threshold-value.

The battery-charge control device configured as mentioned above can promptly and appropriately determine whether the charging is unnecessary even if the battery temperature is not within the chargeable temperature range.

Another aspect of the present invention is a battery charger that comprises an attachment-detecting unit, a temperature-obtaining unit, a voltage-obtaining unit, a threshold-value-determining unit, a determination unit, and a completion-processing unit.

The attachment-detecting unit detects that the battery pack having a battery is attached to the battery charger. The temperature-obtaining unit obtains the battery temperature, which is a temperature of the battery. The voltage-obtaining unit obtains at least one of a voltage of the entire battery or a voltage of a part of the battery. The threshold-value-determining unit determines, based on the battery temperature obtained by the temperature-obtaining unit, the completion-threshold-value that corresponds to the battery temperature for determining necessity of charging of the battery in a case where the attachment-detecting unit detects that the battery pack is attached to the battery charger. The determination unit performs a determination of whether an obtained voltage, which is a voltage obtained by the voltage-obtaining unit, is equal to or greater than the completion-threshold-value determined by the threshold-value-determining unit in a case where the attachment-detecting unit detects that the battery pack is attached to the battery charger. The completion-processing unit performs a specified battery-charge completion processing that indicates unnecessity of charging the battery by the battery charger in a case where the determination unit determines that the obtained voltage is equal to or greater than the completion-threshold-value.

The battery charger configured as mentioned above can effectively reduce overcharging of the battery inside the battery pack when the battery pack is attached to the battery charger.

Another aspect of the present invention is a battery pack having a battery that comprises an attachment-detecting unit, a temperature-obtaining unit, a voltage-obtaining unit, a threshold-value-determining unit, a determination unit, and a transmitting unit.

The attachment-detecting unit detects that the battery pack is attached to the battery charger. The temperature-obtaining unit obtains the battery temperature, which is a temperature of the battery. The voltage-obtaining unit obtains at least one of a voltage of the entire battery or a voltage of a part of the battery. The threshold-value-determining unit determines, based on the battery temperature obtained by the temperature-obtaining unit, the completion-threshold-value that corresponds to that battery temperature for determining necessity of charging the battery in a case where the attachment-detecting unit detects that the battery pack is attached to the battery charger. The determination unit performs a determination of whether the obtained voltage, which is obtained by the voltage-obtaining unit, is equal to or greater than the completion-threshold-value determined by the threshold-value-determining unit in a case where the attachment-detecting unit detects that the battery pack is attached to the battery charger. The transmitting unit sends information, indicating unnecessity of charging of the battery by the battery charger, to the battery charger in a case where the determination unit determines that the obtained voltage is equal to or greater than the completion-threshold-value.

The battery pack configured as mentioned above can effectively reduce overcharging of the battery when the battery is attached to the battery charger.

BRIEF DESCRIPTION OF THE DRAWINGS

Embodiments where the present invention is applied will be described hereinafter with reference to the drawings, in which:

FIG. 7 is a flowchart of a notification processing of Embodiment 2;

FIG. 8 is an explanatory diagram showing another example of the completion-threshold-value.

DETAILED DESCRIPTION OF THE PREFERRED EMBODIMENTS

Embodiment 1

(1) Schematic Configuration of Battery-Charge System

Figure 1:
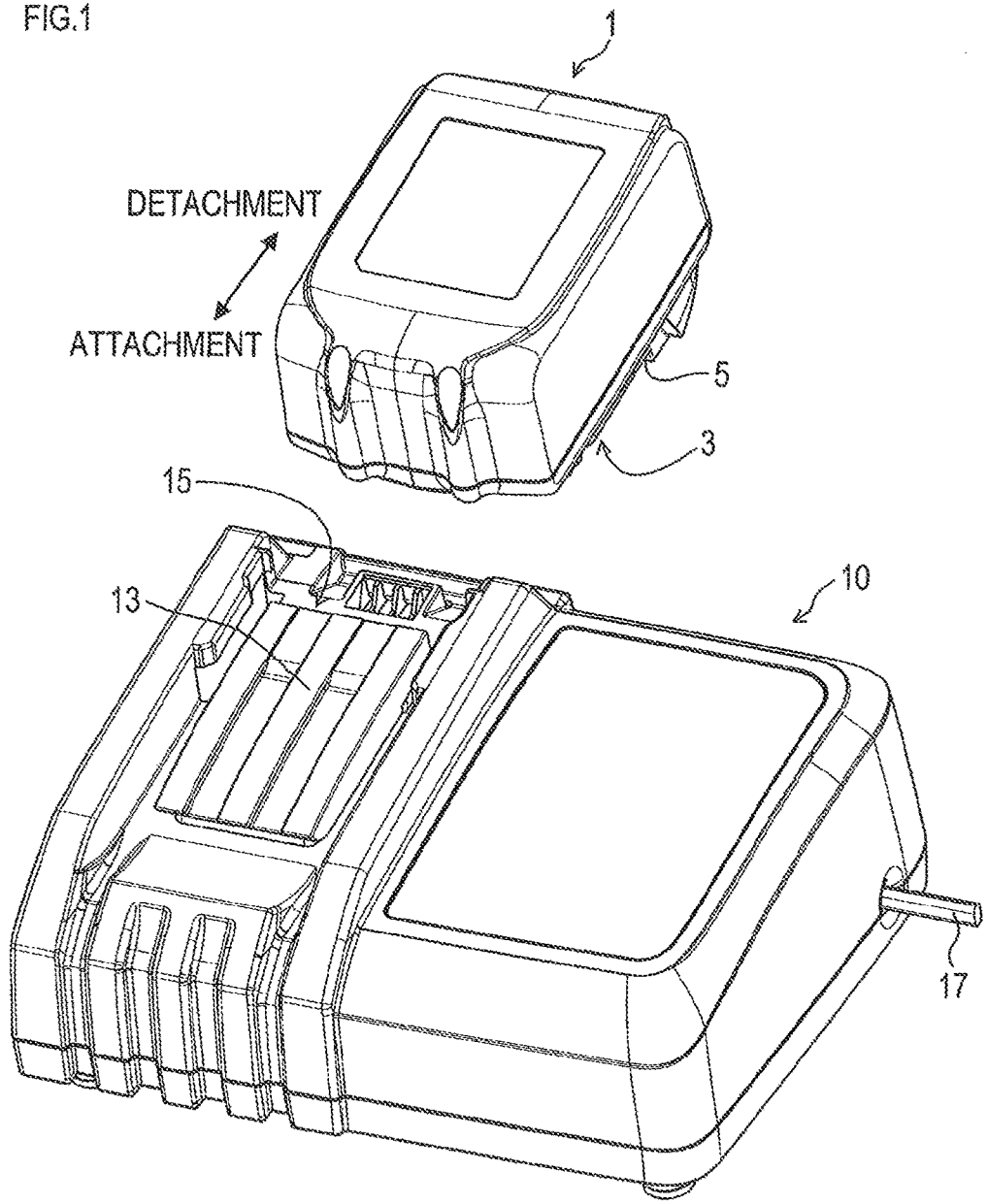
FIG. 1 is a perspective view showing an external appearance of a battery-charge system of Embodiment 1.

A battery-charge system of present Embodiment 1 comprises a battery pack 1 and a battery charger 10 as shown in FIG. 1. The battery pack 1 is configured to be freely attachable and detachable to various rechargeable electric power equipment such as rechargeable electric power tools, rechargeable vacuum cleaners, and rechargeable lawn mowers, and to be capable of supplying electric power to the power sources (for example, motors) of such equipment. The battery charger 10 is configured to be capable of charging a battery 30 inside the battery pack 1 (see, FIG. 2).

The battery charger 10 receives a supply of an alternating current from an external power supply (for example, a commercial alternating current power supply) via a power supply code 17, and based on this alternating current, generates charging electricity (direct current voltage, direct current) for charging the battery 30 and supplies the charging electricity to the battery 30 inside the battery pack 1.

An attachment unit 13 for attaching the battery pack 1 is formed on the top surface of the battery charger 10. This attachment unit 13 is formed to conform to the shape of the back surface of an attachment unit 3 of the battery pack 1 so that the battery pack 1 is attachable to and detachable from the attachment unit 13 by sliding.

A terminal unit 15 is formed on the attachment unit 13 of the battery charger 10; the terminal unit 15 can be fitted to a terminal unit 5 formed on the back surface of the battery pack 1 when the battery pack 1 is attached to the battery charger 10. The terminal unit 5 of the battery pack 1 is provided with a plurality of terminals 21 to 26 (see, FIG. 2), which will be mentioned later. The terminal unit 15 of the battery charger 10 is provided with a plurality of terminals 41 to 46 (see, FIG. 3), which will be mentioned later.

(2) Configuration of Battery Pack 1

Figure 2:
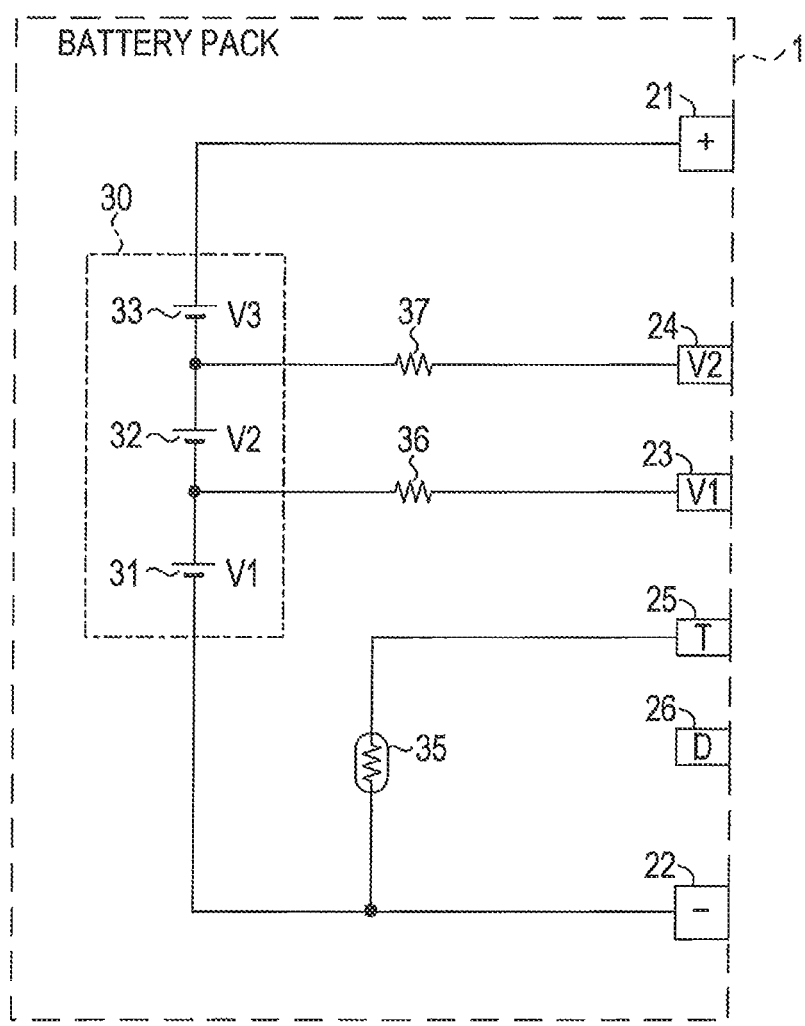
FIG. 2 is an electric circuit diagram of a battery pack of Embodiment 1.

A configuration of the battery pack 1 is now explained with reference to FIG. 2. As shown in FIG. 2, the battery pack 1 comprises a positive-electrode terminal 21, a negative-electrode terminal 22, a V1-output terminal 23, a V2-output terminal 24, a temperature-output terminal 25, and a communication terminal 26 as terminals to be electrically coupled to the battery charger 10 when the battery pack 1 is attached to the battery charger 10. The battery 30 is housed in the battery pack 1.

In a case, for example, where the battery pack 1 is attached to the battery charger 10, the charging electricity outputted from the battery charger 10 is supplied to the battery 30 via the positive-electrode terminal 21 and the negative-electrode terminal 22 of the battery pack 1. And, in a case, for example, where the battery pack 1 is attached to rechargeable electric power equipment, electricity for operating the rechargeable electric power equipment is outputted from the battery 30 via the positive-electrode terminal 21 and the negative-electrode terminal 22.

The battery 30 is configured to have a plurality of chargeable and dischargeable secondary battery cells (hereinafter simply referred to as "cells") connected in series. More specifically, the battery 30 is configured to have three cells, namely a first cell 31, a second cell 32, and a third cell 33, connected in series in the present embodiment.

A positive-electrode of the battery 30 (that is, a positive-electrode of the third cell 33) is coupled to the positive-electrode terminal 21; and a negative-electrode the battery 30 (that is, a negative-electrode of the first cell 31) is coupled to the negative-electrode terminal 22. The battery 30 of the present embodiment is a lithium-ion secondary battery.

A positive-electrode of the first cell 31 is coupled to the V1-output terminal 23 via a resistor 36; and a positive-electrode of the second cell 32 is coupled to the V2-output terminal 24 via a resistor 37. The V1-output terminal 23 is a terminal for externally outputting a first cell-voltage V1 that is a voltage of the first cell 31. The V2-output terminal 24 is a terminal for externally outputting a second cell-voltage V2 that is a voltage of the second cell 32.

A thermistor 35 is disposed inside the battery pack 1. The thermistor 35 is disposed in the vicinity of the battery 30 (for example, in the vicinity of any one of the cells) with the aim of detecting the temperature of the battery 30 (the battery temperature). The thermistor 35 is coupled to the negative-electrode terminal 22 on one end, and is coupled to the temperature-output terminal 25 on the other end.

Figure 3:
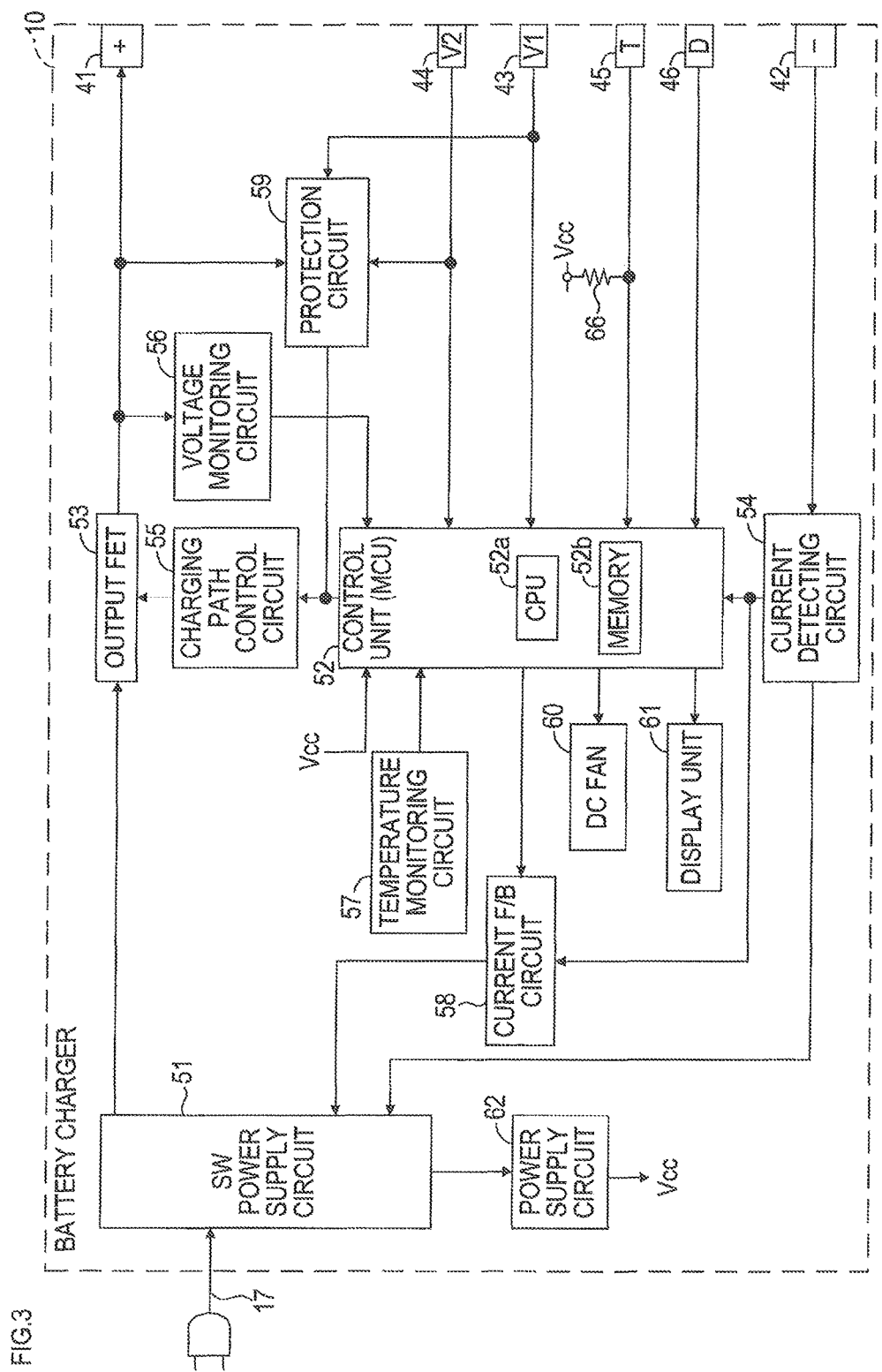
FIG. 3 is a block diagram showing an electrical configuration of a battery charger of Embodiment 1.

Once the battery pack 1 is attached to the battery charger 10, the temperature-output terminal 25 of the battery pack 1 is coupled to the temperature-input terminal 45 of the battery charger 10 (see, FIG. 3). The temperature-input terminal 45 is coupled to a control unit 52 as well as to one end of a resistor 66 in the battery charger 10. A power-supply-voltage VCC of a specified direct current voltage value is applied to the other end of the resistor 66.

Such configuration, a series circuit of the resistor 66 inside the battery charger 10 and the thermistor 35 inside the battery pack 1 is formed once the battery pack 1 is attached to the battery charger 10, and the power-supply-voltage VCC of the battery charger 10 is applied to this series circuit. Then, a divided voltage value, which is the power-supply-voltage VCC divided between the resistor 66 and the thermistor 35, that is voltages of both ends of the thermistor 35, is outputted from the temperature-output terminal 25 of the battery pack 1 as a signal that indicates the temperature of the battery 30 (hereinafter also referred to as "battery-temperature detection signal") and inputted to the control unit 52 in the battery charger 10 via the temperature-input terminal 45. The control unit 52 of the battery charger 10 obtains and recognizes the temperature of the battery 30 based on the battery-temperature detection signal.

The communication terminal 26 is originally a terminal used for data communications between the battery pack 1 and the battery charger 10; however, the battery pack 1 of the present embodiment is configured simply, comprising no data communication function. For this reason, the communication terminal 26 is provided merely to serve as a dummy terminal and is substantially not used in the battery pack 1 of the present embodiment.

(3) Configuration of Battery Charger 10

A configuration of the battery charger 10 is now explained with reference to FIG. 3. The battery charger 10 comprises a positive-electrode terminal 41, a negative-electrode terminal 42, a V1-input terminal 43, a V2-input terminal 44, the temperature-input terminal 45, a communication terminal 46 as terminals to be electrically coupled to the battery pack 1 when the battery pack 1 is attached to the battery charger 10.

Once the battery pack 1 is attached to the battery charger 10, the positive-electrode terminal 41 of the battery charger 10 is electrically coupled to the positive-electrode terminal 21 of the battery pack 1; the negative-electrode terminal 42 of the battery charger 10 is electrically coupled to the negative-electrode terminal 22 of the battery pack 1; a V1-input terminal 43 of the battery charger 10 is electrically coupled to the V1-output terminal 23 of the battery pack 1, the V2-input terminal 44 of the battery charger 10 is electrically coupled to the V2-output terminal 24 of the battery pack 1; the temperature-input terminal 45 of the battery charger 10 is electrically coupled to the temperature-output terminal 25 of the battery pack 1; and, the communication terminal 46 of the battery charger 10 is electrically coupled to the communication terminal 26 of the battery pack 1.

The battery charger 10 also comprises a switching (hereinafter abbreviated to "SW") power-supply circuit 51 and the control unit 52.

The SW power-supply circuit 51 generates charging electricity for charging the battery (charging current, or the charging voltage) based on the alternating current supplied from an external power supply via the power supply code 17, and supply the charging electricity to the battery pack 1 via the positive-electrode terminal 41 and the negative-electrode terminal 42. The control unit 52 controls the generation of the charging electricity by the SW power-supply circuit 51.

The SW power-supply circuit 51 comprises, for example, a rectifying circuit that rectifies an alternating current to a direct current; a converting circuit that converts the direct current voltage rectified by the rectifying circuit to a voltage for charging the battery 30; and a smoothing circuit that smoothes the voltage converted by the converting circuit to generate direct current charging electricity.

Once the battery pack 1 is attached to the battery charger 10, a closed circuit for charging is established that starts from the SW power-supply circuit 51 to the SW power-supply circuit 51 via an output-FET 53, the positive-electrode terminal 41, the battery pack 1, the negative-electrode terminal 42, and a current-detecting circuit 54.

The output-FET 53 is disposed on a conduction path between the SW power-supply circuit 51 and the positive-electrode terminal 21 so as to complete or interrupt this conduction path. The output-FET 53 may be configured with one FET, or with a combined circuit of a plurality of FETs. The output-FET 53 is turned on or off by the changeover signal from a charging-path control circuit 55; when it is turned on, the aforementioned conduction path is completed, and when it is turned off, the aforementioned conduction path is interrupted.

The charging-path control circuit 55 outputs the changeover signal in accordance with a changeover control command from the control unit 52. That is to say that, when the changeover control command that indicates that the output-FET 53 should be turned on is inputted, the charging-path control circuit 55 outputs the changeover signal for turning on the output-FET 53; and when the changeover control command that indicates that the output-FET 53 should be turned off, the charging-path control circuit 55 outputs the changeover signal for turning off the changeover signal.

The current-detecting circuit 54 is disposed on a conduction path between the negative-electrode terminal 42 and the SW power-supply circuit 51 so as to detect a current that flows in this conduction path. The current-detecting circuit 54 outputs a current-detection signal, which indicates a value of a current that flows in the aforementioned conduction path. The current-detecting circuit 54 may be configured to comprise, for example, a resistor that is coupled in series with the conduction path, and a circuit that outputs the voltages at both ends of the resistor as the current-detection signal. The current-detection signal from the current-detecting circuit 54 is inputted to the control unit 52 and to the current-feedback circuit 58.

The battery charger 10 comprises a voltage-monitoring circuit 56 and a temperature monitoring circuit 57. The voltage-monitoring circuit 56 is coupled to the conduction path between the output-FET 53 and the positive-electrode terminal 41, and outputs a voltage-detection signal that indicates the voltage of this conduction path. A voltage (battery voltage) Vb of the battery 30 is detected by the voltage-monitoring circuit 56 and the voltage-detection signal that indicates the battery voltage Vb is inputted to the control unit 52 when the battery pack 1 is attached to the battery charger 10.

The temperature monitoring circuit 57 is disposed on a given point inside the battery charger 10, aiming to detect the temperature inside the battery charger 10. The temperature monitoring circuit 57 outputs a battery-charger-temperature detection signal which is in accordance with the temperature inside the battery charger 10. The temperature monitoring circuit 57 may have various types of configurations as long as it can output information indicating the temperature inside the battery charger 10. For example, circuit configurations may include a thermistor or a temperature-detection element of the kind.

The control unit 52 comprises several functions including a function to control charging of the battery pack 1 that is attached to the battery charger 10. The control unit 52 comprises a CPU 52a, a memory 52b, and so on. The functions of the control unit 52 are rendered mainly by execution of various programs sored in the memory 52b by the CPU 52a.

Once the battery pack 1 is attached to the battery charger 10, the battery-temperature detection signal is inputted to the control unit 52 via the temperature-input terminal 45. The control unit 52 comprises a function to detect that the battery pack 1 is attached to the battery charger 10 based on the battery-temperature detection signal. Note that methods to determine whether the batter pack 1 is attached to the battery charger 10 may be any methods other than those based on the battery-temperature detection signal. For example, a determination of whether the battery pack 1 is attached to the battery charger 10 may be performed based on the voltage-detection signal from the voltage-monitoring circuit 56. In this manner, the control unit of the battery charger of the present embodiment may determine whether the battery pack is attached to the battery charger based on an electric signal.

The control unit 52 can obtain the first cell-voltage V1 from the battery pack 1 via the V1-input terminal 43 when the battery pack 1 is attached to the battery charger 10, and can obtain the second cell-voltage V2 from the battery pack 1 via the V2-input terminal 44. Note that the second cell-voltage V2 is technically obtained based on a difference between the input voltage of the V2-input terminal 44 and the input voltage of the V1-input terminal 43. A third cell-voltage V3, which is the voltage of the third cell 33, can be obtained by calculation using the battery voltage Vb that is detected by the voltage-monitoring circuit 56, the first cell-voltage V1, and the second cell-voltage V2. Each of the cell-voltages V1, V2, and V3 may also be obtained from the battery pack 1 by other methods. For example, they may be obtained by data communication if data communication is possible between the battery pack 1 and the battery charger 10.

The battery-temperature detection signal is inputted to the control unit 52 from the battery pack 1 via the temperature-input terminal 45 when the battery pack 1 is attached to the battery charger 10. The control unit 52 can obtain and recognize the battery temperature based on the battery-temperature detection signal.

Note that, although the battery pack 1 of the present embodiment comprises the communication terminal 26, this communication terminal 26 serves as a dummy terminal and substantially does not function. Thus, the battery charger 10 will not have data communication with the battery pack 1 via the communication terminal 46 when this battery pack 1 is attached to the battery charger 10. Although it depends on the type of the battery pack, some battery packs, such as a battery pack 70 of Embodiment 2 (see FIG. 6) which will be mentioned later, are configured to be capable of data communication with the battery charger 10 via the communication terminal 26. The battery charger 10 carries out data communication with the battery pack via the communication terminal 46 as need arises when the battery pack that is configured capable of data communication as described above is attached to the battery charger 10.

The battery charger 10 in the present embodiment is configured to charge the battery 30 of the battery pack 1 by Constant Current Constant Voltage charging method (also referred to as CCCV charging method). The specifics of charging by the CCCV charging method are already well known; thus, only the outline thereof will be explained here for confirmation purposes without explaining the specifics. Note that a battery that is configured with a single cell will be used as an example to simplify the explanation.

In the CCCV charging method, a constant charging current is first supplied to a battery until the battery voltage (equivalent to the cell-voltage of a single cell in the present example) reaches the preset charging voltage after the charging is started. In other words, CC (constant current) charging is performed first. Then, the charging method is changed from the CC charging to CV (constant voltage) charging once the cell-voltage reaches the charging voltage; and the charging is continued as the charging current is adjusted to keep the cell-voltage at the charging voltage. And, a determination is made on whether a condition for completing battery charge, with which the charging should be completed, is satisfied based on, for example, an elapsed time after the charging method is changed to the CV charging, a value of the charging current, and a rate of decrease of the charging current. And, when the condition is satisfied, the battery is regarded as being charged to the full-charge condition; the supply of the charging current to the battery is stopped and the charging is completed. If the cell-voltage is already equal to or greater than the charging voltage before starting the CC charging, then the charging is not performed.

The battery 30 in the present embodiment is configured with a plurality of cells 31, 32, and 33 that are connected in series. Therefore, as for the CC charging, the control unit 52 in the battery charger 10 in the present embodiment continues the CC charging until the maximum value (hereinafter also referred to as "maximum cell-voltage") among the respective cell-voltages V1, V2, and V3 of the cells 31, 32, and 33 is at the preset charging voltage. In other words, the control unit 52 calculates the value of the charging current that should be supplied to the battery 30 and outputs the charge control signal, which indicates the value of the charging current, to the current-feedback circuit 58, as it monitors each of the cell-voltages V1, V2, and V3.

The current-feedback circuit 58 receives an input of the charge control signal from the control unit 52, and also an input of the current-detection signal from the current-detecting circuit 54. The current-feedback circuit 58 controls the SW power-supply circuit 51 by comparing an actual charging current, which is indicated by the current-detection signal inputted from the current-detecting circuit 54, with a target value of the charging current, which is indicated by the charge control signal inputted from the control unit 52, and outputting a control command for matching the actual charging current to the target value to the SW power-supply circuit 51. The SW power-supply circuit 51 generates the charging electricity in accordance with the control command that is inputted from the current-feedback circuit 58 and outputs the charging electricity to the battery 30.

After the CC charging is started, the control unit 52 changes the charging method to the CV charging if the maximum cell-voltage reaches the preset charging voltage. To be more specific, the control unit 52 continues the charging by generating the charge control signal, based on the maximum cell-voltage, to continue the charging while keeping the maximum cell-voltage at the charging voltage and output the signal to the current-feedback circuit 58. Once the given condition for completing battery charge is satisfied, the charging is completed by regarding that the entire battery 30 has been charged to the full-charge condition.

Note that changing from the CC charging to the CV charging based on the maximum cell-voltage, making a determination on the condition for completing battery charge, or the like is only an example. For example, the charging voltage may be set for the battery voltage Vb and the CCCV charging may be performed based on the battery voltage Vb.

When starting a series of charge controls for charging the battery 30 based on the CCCV charging method, the control unit 52 turns on the output-FET 53 by outputting the changeover control command, which indicates to the charging-path control circuit 55 that the output-FET 53 should be turned on, and completes the conduction path from the SW power-supply circuit 51 to the battery 30.

Meanwhile, if the battery 30 is in the full-charge condition after the charge control is started, then the control unit 52 stops the charging and ends the charge control. To be more specific, the control unit 52 stops or lowers the output of the charging current from the SW power-supply circuit 51 by outputting a predefined signal, which is for stopping or lowering the output of the charging current, to the current-feedback circuit 58 and also turns off the output-FET 53 by outputting the changeover control command, which indicates that the output-FET 53 should be turned off, to the charging-path control circuit 55 to interrupt the conduction path from the SW power-supply circuit 51 to the battery 30. The control unit 52 notifies that the charge control is ended by, for example, lighting an LED of a display unit 61 when the charge control is ended.

Note that the charge control is ended without performing the charging if the maximum cell-voltage is already equal to or greater than the charging voltage at the time of starting the charge control. The control unit 52 notifies, also in this case, that the charge control is ended by, for example, lighting the LED of the display unit 61.

The battery charger 10 comprises a protection-circuit 59, a DC fan 60, and the display unit 61.

The protection-circuit 59 monitors each of the cell-voltages V1, V2, and V3 of the battery 30 and the battery voltage Vb based on a voltage inputted from the V1-input terminal 43, a voltage inputted from the V2-input terminal 44, and a voltage of the positive-electrode terminal 41. If any one of the voltages satisfies a given overvoltage condition, then a force-off command to forcibly turn off the output-FET 53 is outputted to the charging-path control circuit 55. The charging-path control circuit 55 forcibly turns off the output-FET 53 regardless of the content of the changeover control command from the control unit 52 when the force-off command is inputted from the protection-circuit 59.

The DC fan 60 is a fan for blowing air to cool the inside of the battery pack 1 (mainly the battery 30); the operation thereof is controlled by the control unit 52. If a predefined fan-operating condition is satisfied (in other words, if cooling is required inside the battery pack 1), then the control unit 52 operates the DC fan 60 to blow air to the battery pack 1 while the battery pack 1 is attached to the battery charger 10.

The display unit 61 comprises a display device that is capable of displaying various information. The display device may be, for example, an LED or a liquid-crystal display. In the present embodiment, the display unit 61 comprises at least one LED. The operation of the display unit 61 is controlled by the control unit 52.

The battery charger 10 comprises a power-supply circuit 62. The power-supply circuit 62 receives an input of a direct current voltage (for example, an output of the aforementioned rectifying circuit) that is generated inside the SW power-supply circuit 51, converts this input voltage to the power-supply-voltage VCC of a direct current at a predefined voltage value (for example, 5V), and outputs the power-supply-voltage VCC. The power-supply-voltage VCC that is outputted from the power-supply circuit 62 is used as a power supply for operation for each components inside the battery charger 10 (for example, the control unit 52, and the DC fan 60).

(4) Outline of Operation Mode

The control unit 52 of the battery charger 10 in the present embodiment does not immediately start the charge control in accordance with the CCCV charging method without any conditions when the battery pack 1 is attached to the battery charger 10; the control unit 52 sets the operation mode to the charging-standby mode once. In the charging-standby mode, a determination is made on whether a condition for allowing to start charging is satisfied; and the charging-standby mode continues until it is satisfied. The operation mode is changed from the charging-standby mode to a charging mode when the condition for allowing to start charging is satisfied, and the charge control for charging the battery 30 is started.

The condition for allowing to start charging can be appropriately determined and is set for the battery temperature in the present embodiment. To be more specific, it is configured to perform the charge control of the battery 30 when the battery temperature is within the predefined chargeable temperature range. Therefore, at least a condition that the battery temperature is within the chargeable temperature range is set as the condition for allowing to start charging.

Thus, the control unit 52 continues the charging standby mode until the battery temperature that is obtained via the temperature-input terminal 45 enters the chargeable temperature range in a case where the battery temperature is not within the chargeable temperature range when the battery pack 1 is attached to the battery charger 10. And, the control unit 52 shifts the operation mode from the charging standby mode to the charging mode and starts the charge control when the battery temperature enters the chargeable temperature range. The control unit 52 also shifts the operation mode from the charging standby mode to the charging mode and starts the charge control in a case where the battery temperature is already within the chargeable temperature range when the battery pack 1 is attached to the battery charger 10. Note that the control unit 52 continues to monitor the battery temperature after the charge control is started, and stops the charge control once when the battery temperature leaves the chargeable temperature range.

However, in the present embodiment, the control unit 52 does not simply perform a determination of whether the condition for allowing to start charging is satisfied, but it also performs a repetition-completion decision (hereinafter simply referred to as "completion decision") and a determination on the necessity of charging. If the battery 30 is already close to full-charge condition, then charging is not performed. This completion decision will be explained in detail later.

Figure 4:
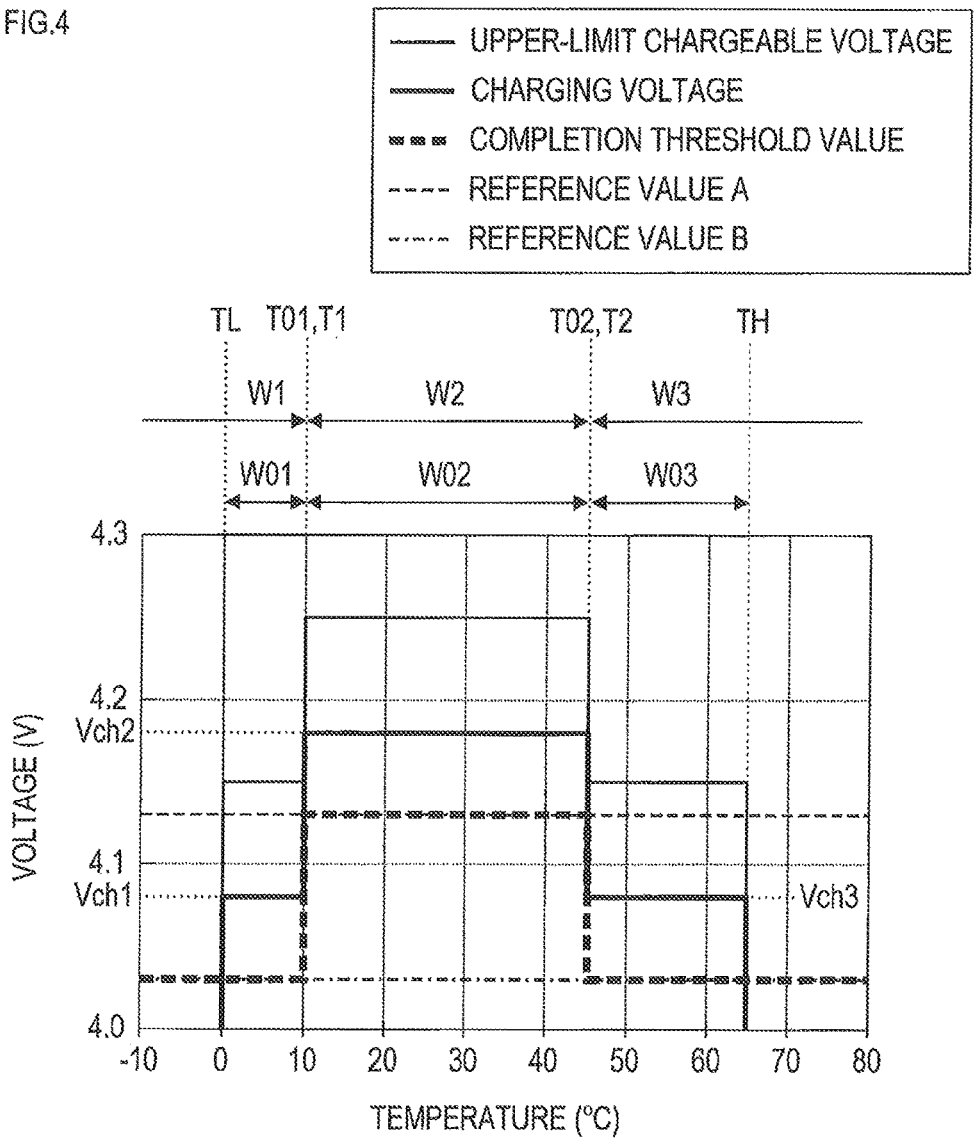
FIG. 4 is an explanatory diagram showing an example of a charging voltage and a completion-threshold-value corresponding to a battery temperature.

The charging voltage, which is used in the charge control that is performed when the battery temperature is within the chargeable temperature range, is set to different values in accordance with the battery temperature within the chargeable temperature range. In the present embodiment, a range from the lower-limit-temperature TL (for example, 0° C.) to the upper-limit-temperature TH (for example, 65° C.) is set as the chargeable temperature range as shown in FIG. 4; and charging of the battery 30 is performed when the battery temperature is within this range.

The chargeable temperature range can be classified into a first range for battery charge W01, a second range for battery charge W02, and a third range for battery charge W03. The first range for battery charge W01 is a range that is equal to or greater than the lower-limit-temperature TL and is below a boundary-temperature for charging T01 (for example, 10° C.). The second range for battery charge W02 is a range that is equal to or greater than the boundary-temperature for charging T01 and is below a boundary-temperature for charging T02 (for example, 45° C.). The third range for battery charge W03 is a range that is equal to or greater than the boundary-temperature for charging T02 and is below the upper-limit-temperature TH.

The charging voltage is set to Vch1 (for example, approximately 4.08V) (hereinafter also referred to as "first charging voltage Vch1") in the first range for battery charge W01; the charging voltage is set to Vch2 (for example, approximately 4.18V) (hereinafter also referred to as "second charging voltage Vch2") in the second range for battery charge W02; and the charging voltage is set to Vch3 (hereinafter also referred to as "third charging voltage Vch3") (for example, approximately 4.08V) in the third range for battery charge W03.

The value of each of the charging voltages Vch1 to Vch3 may be stored in a memory 52b in advance, or may be calculated by a given calculation that is based on the actual battery temperature at the time of the charge control.

Note that a standard for the lithium-ion secondary battery is a cause of the charging voltage being set to different values in accordance with the battery temperature. The lithium-ion secondary battery has an upper-limit chargeable voltage, which is the upper limit value of the chargeable voltage according to the standard; and, the value of the upper-limit chargeable voltage differs by temperature. To be specific, the upper-limit chargeable voltage is set to, for example, approximately 4.15V in the first range for battery charge W01; the upper-limit chargeable voltage is set to, for example, approximately 4.25 V in the second range for battery charge W02; and the upper-limit chargeable voltage is set to, for example, approximately 4.15V in the third range for battery charge W03, as shown in FIG. 4. Therefore, the charging voltage that is a target value actually used in the charge control for each range W01 to W03 is set to a value below the upper-limit chargeable voltage for each range as shown in FIG. 4.

(5) Explanation of Completion Decision

The completion decision, which is performed when the battery pack 1 is attached to the battery charger 10, is explained next in detail. Since the battery 30 is assumed to be close to full-charge condition if the maximum cell-voltage is equal to or greater than the completion-threshold-value when the battery pack 1 is attached to the battery charger 10, the control unit 52 of the battery charger 10 decides that the charging is completed and performs the specified battery-charge completion processing, and does not perform charging.

if the control unit 52 decides that charging is completed in the completion decision, then the control unit 52 notifies the user that the charging is completed (that further charging is not necessary since the battery is fully charged or has enough charging energy close to the full-charge amount left) at least by lighting the LED of the display unit 61 as the specified battery-charge completion processing.

The user can realize that the charging of the battery pack 1 is already completed even when the user attaches the battery pack 1 that is almost fully charged to the battery charger 10, since the control unit 52 is configured to perform the completion decision.

The completion decision is repeatedly performed for the duration of the charging-standby mode, which is from the time when the battery pack 1 is attached to the battery charger 10 to the time when the condition for allowing to start charging is satisfied, until the maximum cell-voltage is equal to or greater than the completion-threshold-value.

In the present embodiment, the completion-threshold-value that is used in the completion decision is set to different values in accordance with the battery temperature. To be more specific, the completion-threshold-value is determined by means of a first calculation method in a first range for threshold value W1, which is below a boundary-temperature for threshold value T1, as shown in FIG. 4. The completion-threshold-value is determined by means of a second calculation method in the second range for threshold value W2, which is equal to or greater than the boundary-temperature for threshold value T1 and is below a boundary-temperature for threshold value T2. The completion-threshold-value is determined by means of a third calculation method in a third range for threshold value W3, which is equal to or greater than the boundary-temperature for threshold value T2.

In the present embodiment, as shown in FIG. 4, the boundary-temperature for threshold value T1 is the same as the boundary-temperature for charging T01; and the boundary-temperature for threshold value T2 is the same as the boundary-temperature for charging T02.

Each calculation method may have various specifics, however, in the present embodiment, subtraction of a given value from the first charging voltage Vch1 is adopted as the first calculation method; subtraction of a given value from the second charging voltage Vch2 is adopted as the second calculation method; and subtraction of a given value from the third charging voltage Vch3 is adopted as the third calculation method.

Values for the aforementioned given values may be appropriately determined. The values may be the same for all, or at least two of the values may be the same; however, in the present embodiment, each value is set to 0.05V as one example. That is to say that, a value after subtracting 0.05V from the first charging voltage Vch1 (for example, 4.03V) is set as the completion-threshold-value in the first range for threshold value W1 as shown in FIG. 4. Likewise, a value after subtracting 0.05V from the second charging voltage Vch2 (for example, 4.13V) is set as the completion-threshold-value in the second range for threshold value W2. And, a value after subtracting 0.05V from the third charging voltage Vch3 (for example, 4.03V) is set as the completion-threshold-value in the third range for threshold value W3.

The aforementioned each value may be determined with a consideration of changes in impedance of the battery 30 in accordance with the battery temperature. To be more specific, for example, the given value to be subtracted from the first charging voltage Vch1 may be set to a rather greater value in the first range for threshold value W1, so as to make the difference between the first charging voltage Vch1 and the completion-threshold-value greater than the difference between the second charging voltage Vch2 and the completion-threshold-value in the second range for threshold value W2. Adversely, the given value to be subtracted from the third charging voltage Vch3 may be set to a rather smaller value in the third range for threshold value W3, so as to make the difference between the third charging voltage Vch3 and the completion-threshold-value smaller than the difference between the second charging voltage Vch2 and the completion-threshold-value in the second range for threshold value W2.

(6) Explanation of Charging Processing

The charging processing, including the aforementioned completion decision, performed by the control unit 52 of the battery charger 10 is explained next with reference to FIG. 5. The control unit 52 of the battery charger 10 starts the charging processing shown in FIG. 5 when it detects that the battery pack 1 is attached to the battery charger 10. To be more specific, the CPU 52a executes the charging processing by reading a program for the charging processing of FIG. 5, which is stored in the memory 52b.

After starting the charging processing as the attachment of the battery pack 1 is detected, the control unit 52 (specifically, the CPU 52a) obtains a current battery temperature Tnow in S110 based on the battery-temperature detection signal inputted from the temperature-input terminal 45. Note that the control unit 52 sets the operation mode to the charging-standby mode when it detects the attachment of the battery pack 1.

The charging voltage is determined in S120 based on the battery temperature Tnow obtained in S110. In the present embodiment, for example, if the battery temperature Tnow is within the second range for battery charge W02, then the charging voltage is determined to be the second charging voltage Vch2 that corresponds to the second range for battery charge W02 as mentioned above.

The battery voltage Vb for the current moment and each of the cell-voltages V1, V2, and V3 for the current moment are obtained in S130 based on each voltage inputted from the V1-input terminal 43 and the V2-input terminal 44, and on the voltage-detection signal inputted from the voltage-monitoring circuit 56.

It is determined in S140 whether the current battery temperature Tnow is lower than the boundary-temperature for threshold value T1. If the current battery temperature Tnow is lower than the boundary-temperature for threshold value T1, in other words, if the current battery temperature Tnow is within the first range for threshold value W1 (S140: YES), then the process proceeds to S150. The completion-threshold-value is calculated in S150 by means of the first calculation method. That is to say that, a calculation of subtracting the given value from the first charging voltage Vch1 is conducted; the result of the calculation is determined as the completion-threshold-value. The process proceeds to S190 after the completion-threshold-value is calculated.

If the current battery temperature Tnow is equal to or greater than the boundary-temperature for threshold value T1 (S140: NO) in S140, then the process proceeds to S160. It is determined in S160 whether the current battery temperature Tnow is lower than the boundary-temperature for threshold value T2. If the current battery temperature Tnow is lower than the boundary-temperature for threshold value T2, in other words, the current battery temperature Tnow is within the second range for threshold value W2 (S160: YES), then the process proceeds to S170.

The completion-threshold-value is calculated by means of the second calculation method in S170. That is to say that, a calculation of subtracting the given value from the second charging voltage Vch2 is conducted; the result of the calculation is determined as the completion-threshold-value. The process proceeds to S190 after the completion-threshold-value is calculated.

If the current battery temperature Tnow is equal to or greater than the boundary-temperature for threshold value T2 in S160, in other words, if the current battery temperature Tnow is within the third range for threshold value W3 (S160: NO), then the process proceeds to S180. The completion-threshold-value is calculated by means of the third calculation method in S180. That is to say that, a calculation of subtracting the given value from the third charging voltage Vch3 is conducted; the result of the calculation is determined as the completion-threshold-value. The process proceeds to S190 after the completion-threshold-value is calculated.

It is determined in S190 whether the maximum cell-voltage is equal to or greater than the completion-threshold-value. If the maximum cell-voltage is smaller than the completion-threshold-value (S190: NO), it is then determined in S200 whether the condition for allowing to start charging is satisfied. To be specific, it is determined whether the current battery temperature Tnow is within the chargeable temperature range in the present embodiment. And, if it is within the chargeable temperature range, then it is determined that the condition for allowing to start charging is satisfied; if it is not within the chargeable temperature range, then it is determined that the condition for allowing to start charging is not satisfied.

If the condition for allowing to start charging is not satisfied (S200: NO), then the process goes back to S110 and the process is executed again from S110). In other words, the process from S110 is repeatedly executed until the condition for allowing to start charging is satisfied, unless it is determined in S190 that the maximum cell-voltage is equal to or greater than the completion-threshold-value. If the condition for allowing to start charging is satisfied (S200: YES), then the operation mode is changed from the charging-standby mode to the charging mode in S210 and the charge control is executed. To be specific, the output-FET 53 is turned on and the charge control by means of the CCCV charging method is executed in the present embodiment. It is notified that the charge control is ended by lighting the LED of the display unit 61, etc., once the charge control is ended.

If the maximum cell-voltage is equal to or greater than the completion-threshold-value in S190 (S190: YES), the process proceeds to S220 and the specified battery-charge completion processing is executed. That is to say that, if the maximum cell-voltage is equal to or greater than the completion-threshold-value, then the specified battery-charge completion processing of S220 is executed without performing the charge control regardless of whether the condition for allowing to start charging is satisfied. At least a process to light the LED of the display unit 61 is included in the specified battery-charge completion processing as mentioned above.

(7) Effect of Embodiment 1

As explained above, the battery charger 10 of the present embodiment determines the completion-threshold-value based on the battery temperature (Tnow) for the current moment when the battery pack 1 is attached thereto. To be specific, it determines the completion-threshold-value by means of a calculation method that corresponds to the battery temperature. And, if the maximum cell-voltage is equal to or greater than the completion-threshold-value (in other words, the battery is already fully charged, or closed to the full-charge condition) as a result of the completion decision, then the specified battery-charge completion processing is executed without performing the charge control. Thereby, overcharging of the battery 30 can be reduced effectively and appropriately in accordance with the battery temperature.

If the maximum cell-voltage is equal to or greater than the completion-threshold-value as a result of the completion decision, then the LED of the display unit 61 is lit as the specified battery-charge completion processing. Thereby, the user of the battery pack 1 can immediately recognize that the battery pack 1 is already charged completely and that charging is not necessary when the user attaches the battery pack 1 that is fully charged or that is close to the full-charge condition to the battery charger 10. Therefore, the user can use the battery pack 1 immediately.

Particularly in the present embodiment, the chargeable temperature range is classified into three ranges bounded by the boundary-temperature for charging T01 and T02; likewise, the calculation methods for the completion-threshold-value are also prepared respectively having the boundary-temperature for threshold value T1 and T2 as the boundaries, whose temperatures are the same as the aforementioned boundary-temperatures T01 and T02 respectively. To be specific, the first calculation method that is based on the first charging voltage Vch1 is used in the first range for threshold value W1; the second calculation method that is based on the second charging voltage Vch2 is used in the second range for threshold value W2; and the third calculation method that is based on the third charging voltage Vch3 is used in the third range for threshold value W3. Thereby, based on the battery temperature for the current moment, the completion-threshold-value that is in accordance with and appropriate for the range where the battery temperature belongs is determined; and based on this appropriate completion-threshold-value, necessity of charging can be appropriately determined.

In addition, the completion decision is made even if the battery temperature is not within the chargeable temperature range. To be specific, if the battery temperature for the current moment is lower than the lower-limit temperature TL of the chargeable temperature range, then the completion-threshold-value is calculated based on the first calculation method. In other words, the completion-threshold-value that is the same as the completion-threshold-value at the lower-limit temperature TL, which is the closest temperature to the battery temperature for the current moment among the temperatures within the chargeable temperature range, is calculated; and the completion decision is made based on the completion-threshold-value. If the battery temperature for the current moment is higher than the upper-limit temperature TH of the chargeable temperature range, then the completion-threshold-value is calculated based on the third calculation method. In other words, the completion-threshold-value that is the same as the completion-threshold-value at the upper-limit temperature TH, which is the closest temperature to the battery temperature for the current moment among the temperatures within the chargeable temperature range, is calculated; and the completion decision is made based on the completion-threshold-value. Thereby, it is quickly and appropriately determined whether charging is necessary even if the battery temperature is not within the chargeable temperature range; and thus the user can swiftly recognize necessity of charging of the battery pack 1.

The battery charger 10 executes the completion decision when the battery pack 1 is attached thereto regardless of whether the battery temperature is within the chargeable temperature range. In other words, the completion decision is immediately executed in the charging-standby mode without waiting for a shift from the charging-standby mode to the charging mode. Thus, if the battery is already fully charged or is close to the full-charge condition, the specified battery-charge completion processing can be executed regardless of the battery temperature.

The battery charger 10 does not execute the completion decision only once when the battery pack 1 is attached thereto; it executes the completion decision repeatedly for the duration of the charging-standby mode, which is until the condition for allowing to start charging is satisfied, until the maximum cell-voltage becomes equal to or greater than the completion-threshold-value. Thereby, even if the battery pack 1, whose voltage is temporarily decreased right after discharging, is attached to the battery charger 10, the specified battery-charge completion processing can be executed when the voltage recovers and becomes equal to or greater than the completion-threshold-value. In other words, a swift determination can be made on whether charging is necessary.

This is a supplementary explanation about usefulness of executing the completion decision by means of the completion-threshold-value which is in accordance with the battery temperature as shown in the present embodiment. For example, suppose that the completion-threshold-value is set to a constant reference value A (for example, 4.13V) regardless of the temperature as shown in FIG. 4. This reference value A is a value that is greater than the third charging voltage Vch3 and is lower than the second charging voltage Vch2.

In such a case, if, for example, the battery temperature is within the third range for battery charge W03, and the maximum cell-voltage is within a range that is equal to or greater than the third charging voltage Vch3 and is below the completion-threshold-value (the reference value A), then it is not decided in the completion decision that charging is completed regardless of the fact that the maximum cell-voltage is already greater than the third charging voltage Vch3 that is the target value in the charge control and thus further charging is not possible.

Particularly, when the battery temperature is higher than the upper-limit temperature TH, the charging-standby mode is continued without executing the charge control until the battery temperature decreases to the chargeable temperature range; therefore, a timing to notify the user of necessity of charging will be delayed accordingly.

In contrast, the completion-threshold-value is variably set in accordance with the battery temperature in the battery charger 10 of the present embodiment, and the value is set to be lower than the charging voltage by a given value in the chargeable temperature range. Thus, the user can swiftly recognize necessity of charging when attaching the battery pack 1 to the battery charger 10.

Suppose, for example, the completion-threshold-value is set to a constant reference value B (for example, 4.03V) regardless of the temperature as shown in FIG. 4. This reference value B is lower than all of the charging voltages Vch1 to Vch3. In such a case, if, for example, the battery temperature is within the second range for battery charge W02 and the maximum cell-voltage is slightly higher than the completion-threshold-value (the reference value B) (for example, 4.05V), then it is inevitably decided in the completion decision that charging is completed although the difference between the maximum cell-voltage and the second charging voltage Vch2 is still large and thus a large amount of energy can still be charged.

In contrast, a value that is lower than the charging voltage by a given value is set as the completion-threshold-value in the chargeable temperature range in the battery charger 10 in the present embodiment; thus, an appropriate completion decision which is in accordance with the actual charging condition can be obtained by appropriately setting the aforementioned given value (for example, setting the aforementioned given value so that at least the completion-threshold-value of the second range for threshold value W2 is greater than the respective charging voltages Vch1 and Vch3 of the first range for battery charge W01 and the third range for battery charge W03).

Note that, in the present embodiment, the control unit 52 of the battery charger 10 corresponds to an example of the attachment-detecting unit, the temperature-obtaining unit, the voltage-obtaining unit, the threshold-value-determining unit, the determination unit, and the completion-processing unit of the present invention. The maximum cell-voltage corresponds to an example of the obtained voltage of the present invention. The condition for allowing to start charging corresponds to an example of the condition for starting battery charge of the present invention. The first calculation method, the second calculation method, and the third calculation method each corresponds to an example of the threshold value determining method of the present invention. The boundary-temperature for charging T01 corresponds to an example of the first boundary temperature for battery charge of the present invention; and the boundary-temperature for charging T02 corresponds to an example of the second boundary temperature for battery charge of the present invention. The boundary-temperature for threshold value T1 corresponds to an example of the first boundary temperature for threshold value of the present invention; and the boundary-temperature for threshold value T2 corresponds to the second boundary temperature for threshold value of the present invention. The process in S110 corresponds to an example of the process executed by the temperature-obtaining unit of the present invention. The process in S130 corresponds to an example of the process executed by the voltage-obtaining unit of the present invention. The process in S150, S170, and S180 each corresponds to an example of the process executed by the threshold-value-determining unit of the present invention. The process in S190 corresponds to an example of the process executed by the determination unit of the present invention. And the process in S220 corresponds to an example of the process executed by the completion-processing unit of the present invention.

Embodiment 2

In the aforementioned Embodiment 1, an example of the battery charger 10 executing the completion decision; in the present embodiment, an example of the battery pack executing the completion decision is explained.

Figure 6:
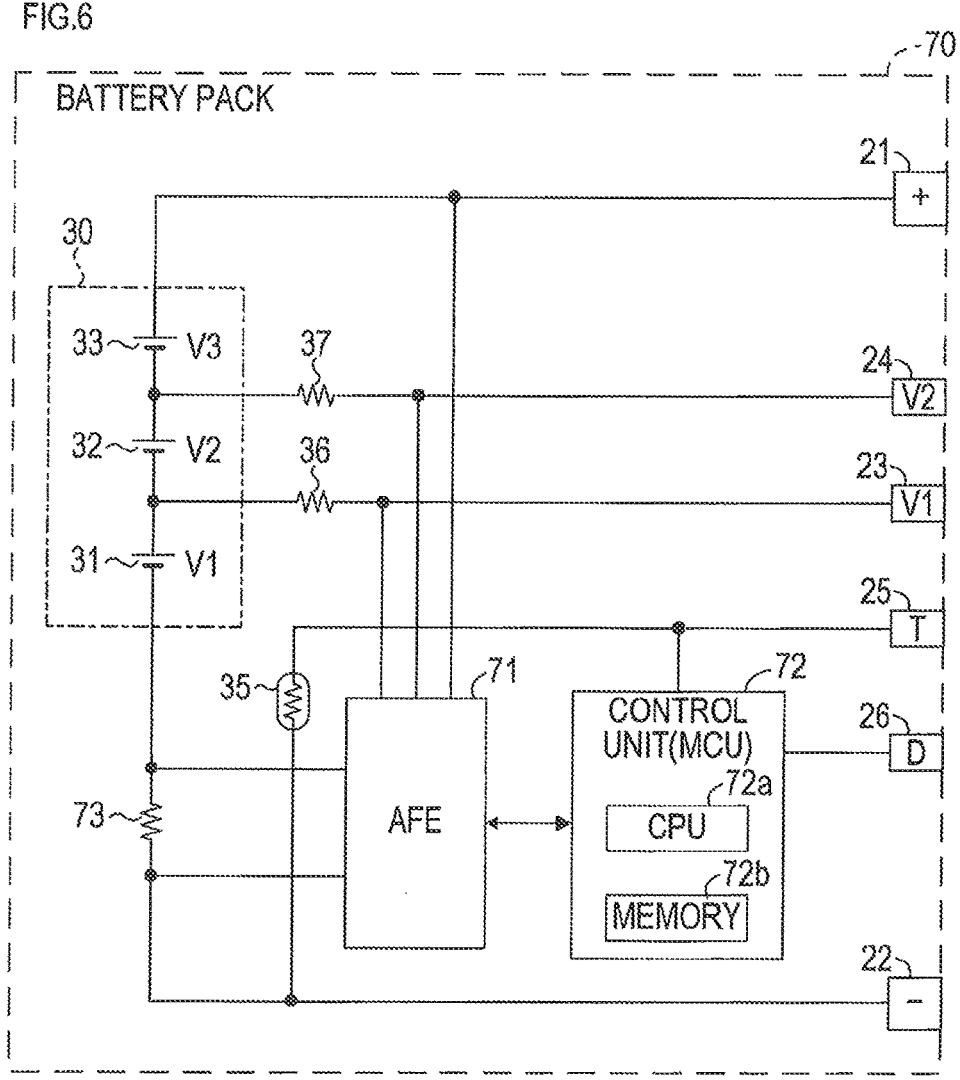
FIG. 6 is an electric circuit diagram of a battery pack of Embodiment 2.

A configuration of the battery pack 70 of the present embodiment is as shown in FIG. 6. As it is obvious in a comparison with the battery pack 1 of Embodiment 1 shown in FIG. 2, the battery pack 70 of the present embodiment shown in FIG. 6 is configured mainly with an AFE71 and a control unit 72 in addition to the battery pack 1 of Embodiment 1. Thus, elements of the battery pack 70 of the present embodiment shown in FIG. 6, which are common with the battery pack 1 of Embodiment 1, are numbered with the same reference numerals as Embodiment 1 and the explanation thereof is not repeated. The main point of the explanation will be the differences from the battery pack 1 of Embodiment 1.

As shown in FIG. 6, the battery pack 70 of the present embodiment comprises the AFE (analogue-front-end) 71 and the control unit 72. The resistor 73 is coupled in series with the conduction path between the negative-electrode terminal 22 and the negative-electrode of the battery 30.

An AFE 12 detects each of the cell-voltage V1, V2, and V3, and the battery voltage Vb in accordance with a command from the control unit 72, and outputs the detected results to the control unit 72. The AFE 12 also detects the current that flows in the battery 30 (charging current or discharging current) based on the voltages on both ends of the resistor 73 in accordance with the command from the control unit 72, and outputs the detected results to the control unit 72.

The control unit 72 comprises a plurality of functions including the notification processing (see, FIG. 7) which will be mentioned later. The control unit 72 comprises a CPU 72a, the memory 72b, and so forth. Those functions of the control unit 72 are performed mainly by the CPU 72a executing various programs that are stored in the memory 72b.

The control unit 72 can obtain each of the cell-voltage V1, V2, and V3, and the battery voltage Vb from the AFE 12. The control unit 72 is also coupled to the temperature-output terminal 25 and is configured so that the battery-temperature detection signal is inputted to the control unit 72. For this reason, the control unit 72 can obtain the battery temperature based on the battery-temperature detection signal. The control unit 72 is also coupled to the communication terminal 26 and is capable of having data communication with the battery charger via the communication terminal 26.

Figure 5:
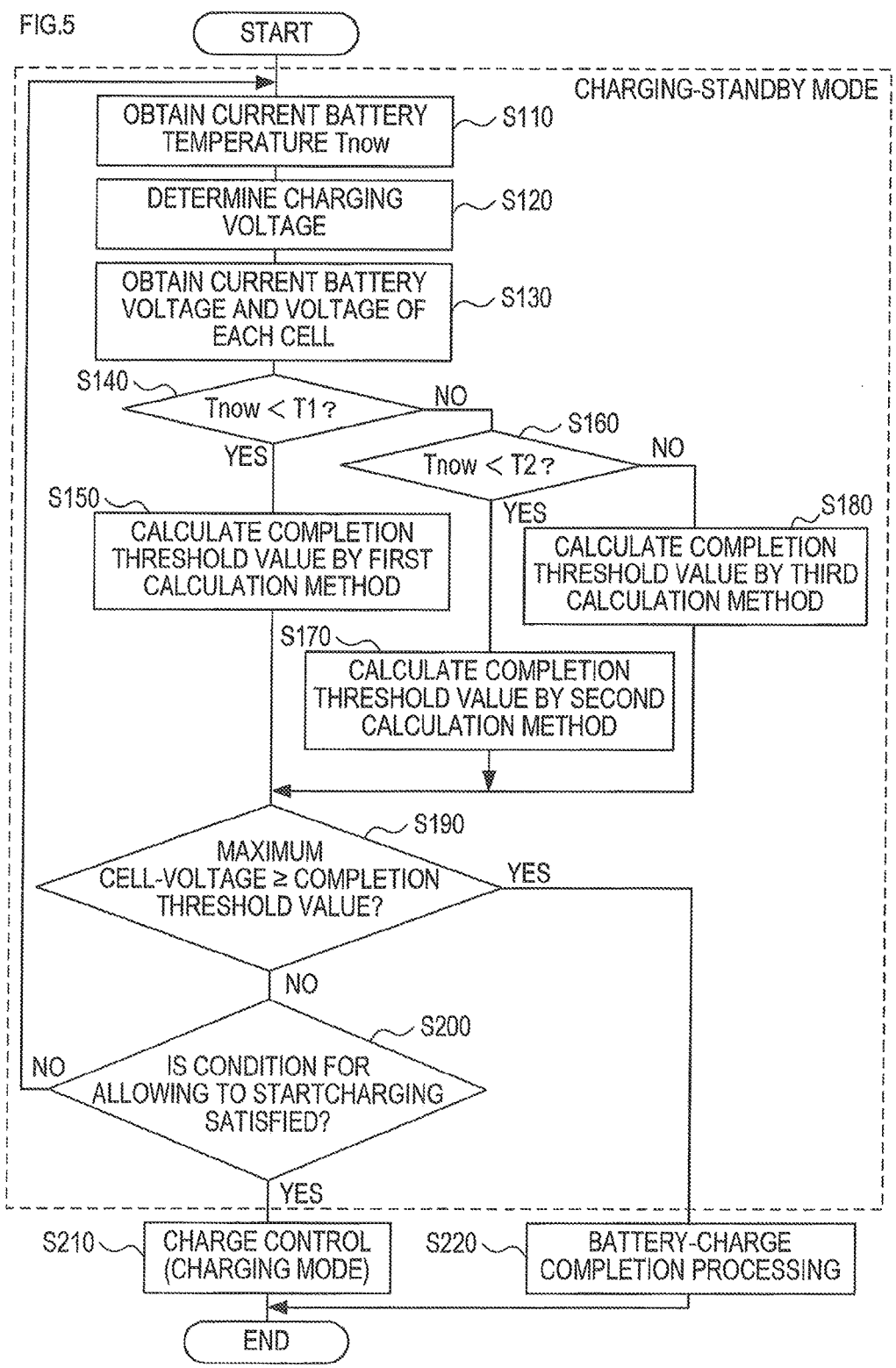
FIG. 5 is a flowchart of charging processing of Embodiment 1.

The battery charger, to which the battery pack 70 is attached, that is assumed in the present embodiment is one that basically does not execute the process for the charging-standby mode in the charging processing shown in FIG. 5. That is to say that, the battery charger of the present embodiment performs a determination whether a wait-notice is received from the battery pack 70 by data communication when the attachment of the battery pack 70 is detected. If the wait-notice is not received, then the charge control (the same control process as in S210) is started; if the wait-notice is received, the battery charger waits until it receives a charging-allowance-notice, and starts the charge control once it receives the charging-allowance-notice. However, if a charging-completion-notice is received while the battery charger is waiting, then the specified battery-charge completion processing (the same process as in S220) is executed without executing the charge control.

In the present embodiment, the satisfaction decision, completion decision, and the like of the condition for allowing to start charging are made by the control unit 72 of the battery pack 70 executing the notification processing shown in FIG. 7; and the results of those decisions are sent to the battery charger.

The control unit 72 of the battery pack 70 starts the notification processing in FIG. 7 once it detects that the battery pack 70 is attached to the battery charger. To be more specific, the CPU 72a reads and executes the program for the notification processing in FIG. 7 that is stored in the memory 72b.

The determination by the control unit 72 on whether the battery pack 70 is attached to the battery charger may be made in various methods. For example, the attachment of the battery pack 70 to the battery charger may be detected by receiving a predefined signal from the battery charger by data communication. Alternatively, for example, a configuration may be provided that receives some kind of signals from the battery charger when the battery pack 70 is attached to the battery charger, and the attachment or non-attachment of the battery pack 70 may be detected based on the presence or non-presence of the received signal. Or, for example, a switch may be provided that is mechanically turned on or off based on the attachment or non-attachment of the battery charger, and the attachment or non-attachment of the battery pack 70 may be detected based on the on and off state of the switch.

Once the control unit 72 (specifically, the CPU 72a) starts the notification processing in FIG. 7 as a result of detecting the attachment of the battery pack 70 to the battery charger, the control unit 72 obtains the current battery temperature Tnow in S310 based on the battery-temperature detection signal. In S320, the control unit 72 obtains the battery voltage Vb for the current moment, and each of the cell-voltages V1, V2, and V3 for the current moment from the AFE 71.

Each process in S330 to S390 is basically the same as each process in S140 to S200 in the charging processing of Embodiment 1 that is shown in FIG. 5. That is to say that, it is determined in the process in S330 to S370 which one of the first range for threshold value W1, the second range for threshold value W2, and the third range for threshold value W3, the battery temperature Tnow belongs to; and the completion-threshold-value is calculated by means of the calculation method that corresponds to the range where the battery temperature Tnow belongs. And, likewise S190 in FIG. 5, it is determined whether the maximum cell-voltage is equal to or greater than the completion-threshold-value in S380. If the maximum cell-voltage is lower than the completion-threshold-value (S380: NO), then it is determined in S390 whether the condition for allowing to start charging is satisfied likewise S200 in FIG. 5.

If the condition for allowing to start charging is satisfied in S390 (S390: YES), then the charging-allowance-notice is sent to the battery charger by data communication in S400. If the condition for allowing to start charging is not satisfied in S390 (S390: NO), then the process proceeds to S410. In S410, the wait-notice is sent to the battery charger by data communication.

If the maximum cell-voltage is equal to or greater than the completion-threshold-value in S380 (S380: YES), then the process proceeds to S420. In S420, the charging-completion-notice is sent to the battery charger by data communication.

Note that a method of sending each notice from the battery pack 70 to the battery charger is not limited to a method of sending that uses data communication. Each notice may be sent by means of communication methods other than data communication. Or, it may also be appropriately determined what kind of signal form is used to send each notice (for example, whether a notice is sent by an analogue signal or by a digital signal).

As explained above, the battery pack 70 of the present embodiment determines the completion-threshold-value based on the battery temperature for the current moment (Tnow) when it is attached to the battery charger; and performs the completion decision by using the completion-threshold-value. And, if the maximum cell-voltage is equal to or greater than the completion-threshold-value (in other words, the battery is already fully charged or is close to the full-charge condition) as a result of the completion decision, the battery pack 70 notifies that the battery 30 is already fully charged or is close to the full-charge condition by sending the charging-completion-notice to the battery charger. Therefore, the same effect as in Embodiment 1 can be attained.

Note that the process in S400, S410, and S420 in the present embodiment corresponds to one example of the process that is executed by the transmitting unit of the present invention.

Other Embodiment

The embodiments of the present invention are as explained above; however, the present invention may adopt various modes without being limited to the aforementioned embodiments.

(1) In Embodiment 1, the value of each of the boundary-temperatures T01 and T02 that bounds the ranges for charging W01 to W03 is respectively the same as each of the boundary-temperatures T1 and T2 that bounds the range for threshold value W1 to W3 in the chargeable temperature range as shown in FIG. 4; however, having the same value as such is not a requirement.

For example, the boundary-temperature for threshold value T1 may be set a value that is smaller than the boundary-temperature for charging T01; the boundary-temperature for threshold value T2 may be set to a value that is greater than the boundary-temperature for charging T02. FIG. 8 shows an example where the boundary-temperature for threshold value T1 is set to a value that is smaller than the boundary-temperature for charging T01 and the boundary-temperature for threshold value T2 is set to a value that is greater than the boundary-temperature for charging T02. In other words, the second range for threshold value W2 is set broader than the second range for battery charge W02, including the entire second range for battery charge W02.

The following effect is attained by setting the second range for threshold value W2 as mentioned above. For example, suppose that the battery temperature is lower than the boundary-temperature for charging T01 and is equal to or greater than the boundary-temperature for threshold value T1 (in other words, a temperature within the first range for battery charge W01 but close to the second range for battery charge W02). In this supposition, once the charging is started, the battery temperature probably rises and enters the second range for battery charge W02, and consequently, the charging voltage becomes greater (the second charging voltage Vch2) and allows more charging. Therefore, in a case where the battery temperature is within the first range for battery charge W01 but close to the second range for battery charge W02, the determination of whether the charging is unnecessary can be appropriately made by setting the completion-threshold-value rather high (to a value that is at least greater than the completion-threshold-value at a temperature lower than the boundary-temperature for threshold value T1), allowing for the possibility that the battery voltage enters the second range for battery charge W02 once the charging is started.

Also, for example, suppose that the battery has just discharged and so the battery temperature is relatively high temperature which is higher than the boundary-temperature for charging T02 and is equal to or lower than the boundary-temperature for threshold value T2 (in other words, a temperature within the third range for battery charge W03 but close to the second range for battery charge W02). In this supposition, the battery temperature probably falls as time passes and enters the second range for battery charge W02 depending on the surrounding environment and radiation efficiency of the battery, etc., and consequently, the charging voltage becomes greater (the second charging voltage Vch2) and allows more charging. Therefore, in a case where the battery temperature is within the third range for battery charge W03 but close to the second range for battery charge W02, a determination of whether the charging is unnecessary can be appropriately made by setting the completion-threshold-value rather high (to a value that is at least greater than the completion-threshold-value at a temperature higher than the boundary-temperature for threshold value T2), allowing for possibility that the battery temperature falls.

(2) The method for calculating the completion-threshold-value in accordance with the battery temperature is not limited to the respective calculation methods for each of the ranges W1, W2, and W3 that are explained in the aforementioned embodiments. For example, the completion-threshold-value may be calculated by multiplying the charging voltage, which corresponds to the battery temperature, by a given coefficient. Or, for example, the completion-threshold-value may be determined by referring to a table of corresponding relations of the battery temperature and the completion-threshold-value that is stored in the memory in advance. Alternatively, the completion-threshold-value may be calculated by means of a given arithmetic formula in which the battery temperature is one of the variables.

(3) In the aforementioned embodiments, it is configured to determine the completion-threshold-value, which is not within the chargeable temperature range, to be the same value as the completion-threshold-value at a temperature closest to the battery temperature among the temperatures within the chargeable temperature range; however, such configuration is merely an example. The completion-threshold-value that is not within the chargeable temperature range may be different from the completion-threshold-value that is within the chargeable temperature range.

(4) The chargeable temperature range of the battery 30 is not limited to the range that is shown in FIG. 4. The temperature range may have no lower limit or higher limit. The present invention is not limited its application to a configuration that has the chargeable temperature range of the battery set to begin with. The present invention can be applied regardless of, for example, having or not having the chargeable temperature range.

(5) In the aforementioned embodiments, the completion decision is made based on the maximum cell-voltage (in other words, based on the result of comparison between the maximum cell-voltage and the completion-threshold-value); however, it is not a requirement to perform the completion decision based on the maximum cell-voltage. For example, it may be configured to determine the completion-threshold-value for the battery voltage Vb that is the voltage of the entire battery 30, and perform the completion decision by comparing the completion-threshold-value with the battery voltage Vb.

(6) The completion decision may be made by the battery charger as in Embodiment 1; or may be made by the battery pack as in Embodiment 2; or may be made by devices or systems other than the battery charger and the battery pack, and the result of the decision may be notified to the battery charger.

(7) The battery that is to be charged by the battery charger is not limited to a lithium-ion secondary battery. The present invention can be applied to a configuration in which a secondary battery other than lithium-ion batteries is charged.

(8) Alternatively, functions of one component in each of the aforementioned embodiments may be broken down to two or more components; or functions of two or more components may be integrated into one component. At least one part of the components in each of the aforementioned embodiments may be replaced by a known configuration that has the same functions. A part of the configuration of each of the aforementioned embodiments may be omitted. At least a part of the configuration of each of the aforementioned embodiments may be added to or may replace a configuration of other embodiment. Note that all modes included in the technical ideas that are identified only by the languages recited in the scope of the claims are the embodiments of the present invention.

What is claimed is:
1. A battery-charge control device comprising:
an attachment-detecting unit configured to detect that a battery pack having a battery is attached to a battery charger;
a setting unit configured to set an operation mode to a charging-standby mode when the attachment-detecting unit detects that the battery pack is attached to the battery charger, whereby charge control of the battery does not immediately start upon attachment of the battery pack to the battery charger until certain predetermined conditions are met;
a temperature-obtaining unit configured to obtain, in the charging-standby mode, a battery temperature, which is a temperature of the battery;
a voltage-obtaining unit configured to obtain, in the charging-standby mode, at least one of a voltage of the entire battery or a voltage of a part of the battery;
a threshold-value-determining unit configured to determine, in the charging-standby mode, based on the battery temperature obtained by the temperature-obtaining unit, a completion-threshold-value that corresponds to the battery temperature for determining necessity of charging of the battery in a case where the attachment-detecting unit detects that the battery pack is attached to the battery charger;
a determination unit configured to perform, in the charging-standby mode, a determination of whether an obtained voltage, which is a voltage obtained by the voltage-obtaining unit, is equal to or greater than the completion-threshold-value determined by the threshold-value-determining unit in a case where the attachment-detecting unit detects that the battery pack is attached to the battery charger; and,
a completion-processing unit configured to perform, without charging of the battery being started by the battery charger, a specified battery-charge completion processing that indicates unnecessity of charging of the battery by the battery charger in a case where the determination unit determines that the obtained voltage is equal to or greater than the completion-threshold-value.

2. The battery-charge control device according to claim 1, wherein the battery charger is configured to start charge control for charging the battery in a case where a specified condition for starting battery charge is satisfied in condition that the battery pack is attached to the battery charger; and,
wherein the determination unit is configured to repeatedly perform the determination during a period until the condition for starting battery charge is satisfied until the determination unit determines that the obtained voltage is equal to or greater than the completion-threshold-value, in a case where the attachment-detecting unit detects that the battery pack is attached to the battery charger.

3. The battery-charge control device according to claim 1, wherein the threshold-value-determining unit is configured to determine the completion-threshold-value by means of a threshold value determining method that corresponds to the battery temperature obtained by the temperature-obtaining unit among at least two types of prepared threshold value determining methods that differ depending on the battery temperature.

4. The battery-charge control device according to claim 3, wherein the battery charger is configured to be allowed to charge the battery in a case where the battery temperature is in a preset chargeable temperature range; and,
wherein the threshold-value-determining unit is configured to determine the completion-threshold-value in the chargeable temperature range by means of the threshold value determining method that corresponds to the battery temperature obtained by the temperature-obtaining unit among at least two types of threshold value determining methods that differ depending on the battery temperature within the chargeable temperature range.

5. The battery-charge control device according to claim 4, wherein the battery charger is configured to charge the battery so that the obtained voltage is equal to the charging voltage that corresponds to the battery temperature obtained by the temperature-obtaining unit, among at least two types of charging voltages that are preset within the chargeable temperature range and differ depending on the battery temperature; and, wherein the threshold-value-determining unit is configured to determine that a value, which is smaller than the charging voltage corresponding to the battery temperature by a given value corresponding to the charging voltage, is the completion-threshold-value, in a case where the battery temperature obtained by the temperature-obtaining unit is within the chargeable temperature range.

6. The battery-charge control device according to claim 5, wherein the charging voltage is set within the chargeable temperature range separately in each of;

a first range for battery charge that is below a given first boundary temperature for battery charge;

a second range for battery charge that is equal to or above the first boundary temperature for battery charge and is below a given second boundary temperature for battery charge; and, a third range for battery charge that is equal to or above the second boundary temperature for battery charge, such that at least the charging voltage in the second range for battery charge is greater than the charging voltage in each of the first range for battery charge and the third range for battery charge; and, wherein, for each range, the threshold-value-determining unit is configured to separately determine that a value, which is smaller than the charging voltage corresponding to each range by a given value corresponding to the charging voltage, is the completion-threshold-value.

7. The battery-charge control device according to claim 4, wherein the charging voltage is set within the chargeable temperature range separately in each of;

a first range for battery charge that is below a given first boundary temperature for battery charge;

a second range for battery charge that is equal to or above the first boundary temperature for battery charge and is below a given second boundary temperature for battery charge; and, a third range for battery charge that is equal to or above the second boundary temperature for battery charge, such that at least the charging voltage in the second range for battery charge is greater than the charging voltage in each of the first range for battery charge and the third range for battery charge; and, wherein the threshold-value-determining unit is configured to determine that;

a value, which is smaller than the charging voltage corresponding to the first range for battery charge by a given value corresponding to the charging voltage, is the completion-threshold-value in a first range for threshold value that is below a given first boundary temperature for threshold value;

a value, which is smaller than the charging voltage corresponding to the second range for battery charge by a given value corresponding to the charging voltage, is the completion-threshold-value in a second range for threshold value that is equal to or above the first boundary temperature for threshold value and is below a given second boundary temperature for threshold value; and, a value, which is smaller than the charging voltage corresponding to the third range for battery charge by a given value corresponding to the charging voltage, is the completion-threshold-value in a third range for threshold value that is equal to or above the second boundary temperature for threshold value, within the chargeable temperature range, and, wherein at least one of;

setting a value for the first boundary temperature for threshold value smaller than a value for the first boundary temperature for battery charge; or, setting a value for the second boundary temperature for threshold value greater than a value for the second boundary temperature for battery charge, is adopted in the threshold-value-determining unit.

8. The battery-charge control device according to claim 4, wherein, in a case where the battery temperature obtained by the temperature-obtaining unit is not within the chargeable temperature range, the threshold-value-determining unit is configured to determine the completion-threshold-value to be the completion-threshold-value at a temperature, within the chargeable temperature range, closest to the battery temperature obtained by the temperature-obtaining unit.

9. A battery charger comprising:

an attachment-detecting unit configured to detect that a battery pack having a battery is attached to the battery charger;

a setting unit configured to set an operation mode to a charging-standby mode when the attachment-detecting unit detects that the battery pack is attached to the battery charger, whereby charge control of the battery does not immediately start upon attachment of the battery pack to the battery charger until certain predetermined conditions are met;

a temperature-obtaining unit configured to obtain, in the charging-standby mode, a battery temperature, which is a temperature of the battery;

a voltage-obtaining unit configured to obtain, in the charging-standby mode, at least one of a voltage of the entire battery or a voltage of a part of the battery;

a threshold-value-determining unit configured to determine, in the charging-standby mode, based on the battery temperature obtained by the temperature-obtaining unit, a completion charging of the battery in a case where the attachment-detecting unit detects that the battery pack is attached to the battery charger;

a determination unit configured to perform, in the charging-standby mode, a determination of whether an obtained voltage, which is a voltage obtained by the voltage-obtaining unit, is equal to or greater than the completion-threshold-value determined by the threshold-value-determining unit in a case where the attachment-detecting unit detects that the battery pack is attached to the battery charger; and, a completion-processing unit configured to perform, without charging of the battery being started by the battery charger, a specified battery-charge completion processing that indicates unnecessity of charging of the battery by the battery charger in a case where the determination unit determines that the obtained voltage is equal to or greater than the completion-threshold-value.

10. A system comprising:

a battery pack having a battery; and a battery charger, wherein the battery pack includes:

an attachment-detecting unit configured to detect that the battery pack is attached to a battery charger;

a temperature-obtaining unit configured to obtain a battery temperature, which is a temperature of the battery;

a voltage-obtaining unit configured to obtain at least one of a voltage of the entire battery or a voltage of a part of the battery;

a threshold-value-determining unit configured to determine, based on the battery temperature obtained by the temperature-obtaining unit, a completion-threshold-value that corresponds to the battery temperature for determining necessity of charging of the battery in a case where the attachment-detecting unit detects that the battery pack is attached to the battery charger;

a determination unit configured to perform a determination of whether an obtained voltage, which is a voltage obtained by the voltage-obtaining unit, is equal to or greater than the completion-threshold-value determined by the threshold-value-determining unit in a case where the attachment-detecting unit detects that the battery pack is attached to the battery charger; and, a transmitting unit for sending information, indicating unnecessity of charging of the battery by the battery charger, to the battery charger in a case where the determination unit determines that the obtained voltage is equal to or greater than the completion-threshold-value, and wherein the battery charger is configured not to charge the battery pack upon receipt, from the battery pack, of the information indicating unnecessity of charging of the battery.

* * * * *